US011396013B2

(12) United States Patent
Wang et al.

(10) Patent No.: US 11,396,013 B2
(45) Date of Patent: Jul. 26, 2022

(54) INTEGRATED MICROFLUIDIC CHIP AND METHODS OF USE

(71) Applicant: CAPITALBIO CORPORATION, Beijing (CN)

(72) Inventors: Lei Wang, Beijing (CN); Yao Zhou, Beijing (CN); Wanli Xing, Beijing (CN); Hu Wang, Beijing (CN); Jing Cheng, Beijing (CN); Xiang Chen, Beijing (CN); Mingxian Lin, Beijing (CN)

(73) Assignee: CAPITALBIO CORPORATION, Beijing (CN)

( * ) Notice: Subject to any disclaimer, the term of this patent is extended or adjusted under 35 U.S.C. 154(b) by 520 days.

(21) Appl. No.: 16/302,081

(22) PCT Filed: May 18, 2017

(86) PCT No.: PCT/CN2017/084928
§ 371 (c)(1),
(2) Date: Nov. 15, 2018

(87) PCT Pub. No.: WO2017/198195
PCT Pub. Date: Nov. 23, 2017

(65) Prior Publication Data
US 2019/0143324 A1    May 16, 2019

(30) Foreign Application Priority Data
May 18, 2016  (CN) .......................... 201610331399.0

(51) Int. Cl.
*B01L 3/00*   (2006.01)
*G01N 35/00*  (2006.01)
(Continued)

(52) U.S. Cl.
CPC ........ *B01L 3/502723* (2013.01); *B01F 33/30* (2022.01); *B01F 35/71725* (2022.01);
(Continued)

(58) Field of Classification Search
CPC ......... B01L 3/502723; B01L 3/502707; B01L 2300/0887; B01L 2400/0409;
(Continued)

(56) References Cited

U.S. PATENT DOCUMENTS

2002/0027133 A1   3/2002  Kellogg et al.
2006/0263265 A1   11/2006 Kang et al.
(Continued)

FOREIGN PATENT DOCUMENTS

CN    105135051 A    12/2015
CN    105195243 A    12/2015
(Continued)

OTHER PUBLICATIONS

English machine translation of CN105135051. (Year: 2021).*
(Continued)

*Primary Examiner* — Russell S Negin
(74) *Attorney, Agent, or Firm* — Rimon, P.C.

(57) ABSTRACT

An integrated microfluidic chip, wherein at least one integrated reaction unit is provided on its substrate, and the integrated reaction unit comprises at least a sample cell (1), a mixing cell (2) and a reaction cell (3) connected through liquid channels (6). In one aspect, one end of the sample cell (1) is provided with a sample inlet (4), and the chip further comprises an internal air circulating system/circuit. One end of the internal air circulating system/circuit is connected with the mixing cell (2), while the other end comprises at least a first circulation branch circuit connected with the end of the sample cell (1) distal to the sample inlet (4).

13 Claims, 4 Drawing Sheets

(51) Int. Cl.

| | | |
|---|---|---|
| *G01N 1/38* | (2006.01) | |
| *G01N 21/07* | (2006.01) | |
| *B01F 33/30* | (2022.01) | |
| *B01F 35/71* | (2022.01) | |
| *G01N 21/27* | (2006.01) | |
| *G01N 21/76* | (2006.01) | |
| *G01N 21/82* | (2006.01) | |
| *G01N 21/03* | (2006.01) | |
| *G01N 21/64* | (2006.01) | |
| *B01F 101/23* | (2022.01) | |
| *B01F 101/00* | (2022.01) | |

(52) U.S. Cl.
CPC .......... *B01L 3/502707* (2013.01); *G01N 1/38* (2013.01); *G01N 21/07* (2013.01); *G01N 35/00* (2013.01); *B01F 2101/2202* (2022.01); *B01F 2101/23* (2022.01); *B01L 2200/0605* (2013.01); *B01L 2200/0684* (2013.01); *B01L 2200/10* (2013.01); *B01L 2300/0803* (2013.01); *B01L 2300/087* (2013.01); *B01L 2300/0864* (2013.01); *B01L 2300/0867* (2013.01); *B01L 2300/0887* (2013.01); *B01L 2300/161* (2013.01); *B01L 2400/0409* (2013.01); *B01L 2400/0688* (2013.01); *G01N 21/272* (2013.01); *G01N 21/76* (2013.01); *G01N 21/82* (2013.01); *G01N 2021/0328* (2013.01); *G01N 2021/6482* (2013.01)

(58) Field of Classification Search
CPC .............. B01F 13/0059; B01F 15/0233; B01F 2215/0034; B01F 2215/0037
See application file for complete search history.

(56) References Cited

U.S. PATENT DOCUMENTS

| | | |
|---|---|---|
| 2013/0344496 A1 | 12/2013 | Peytavi et al. |
| 2017/0014818 A1 | 1/2017 | Wang et al. |

FOREIGN PATENT DOCUMENTS

| | | |
|---|---|---|
| CN | 105203775 A | 12/2015 |
| CN | 105233892 A | 1/2016 |
| CN | 105349401 A | 2/2016 |
| CN | 205797240 U | 12/2016 |
| CN | 107398307 A | 11/2017 |
| JP | 2007078676 A | 3/2007 |
| WO | 2016002731 A1 | 1/2016 |
| WO | 2017/054369 A1 | 4/2017 |
| WO | 2017/198195 A1 | 11/2017 |

OTHER PUBLICATIONS

Responsive to the communication pursuant to Rules 161(2) and 162 EPC for European patent application EP17 798 758.3, dated Jul. 11, 2019, 8 pages.

Supplementary European Search Report for European patent application EP17 798 758.3, dated Sep. 27, 2019, 9 pages.

Amendment prior to examination for European patent application EP17 798 758.3, dated Apr. 22, 2020, 14 pages.

Amendment prior to examination for Japanese patent application JP2018-560523, dated May 15, 2020, 3 pages with extra 4 pages of an English language equivalent or summary.

International search report for patent application PCT/CN2017/084928, dated Jun. 29, 2017, 4 pages (an English language equivalent or summary).

Written opinion of the international searching authority for patent application PCT/CN2017/084928, dated Jul. 11, 2017, 7 pages (an English language equivalent or summary).

International preliminary report on patentability for patent application PCT/CN2017/084928, dated Nov. 20, 2018, 8 pages.

Notice of Reasons for Refusal for Japanese patent application JP2018-560523, dated Feb. 9, 2021, 4 pages with extra 4 pages of English language equivalent or summery.

Notice of Reasons for Refusal for Japanese patent application JP2018-560523, dated May 25, 2021, 2 pages with extra 2 pages of English language equivalent or summary.

\* cited by examiner

INTEGRATED MICROFLUIDIC CHIP AND METHODS OF USE

CROSS-REFERENCE TO RELATED APPLICATIONS

The present application is a U.S. national phase filing of International Patent Application Serial No. PCT/CN2017/084928, entitled "AN INTEGRATED MICROFLUIDIC CHIP AND METHODS OF USE," having an international filing date of May 18, 2017, which claims benefit of priority to Chinese Patent Application No. 201610331399.0, filed on May 18, 2016, the contents of the above applications are incorporated by reference herein in their entireties for all purposes.

TECHNICAL FIELD

The present disclosure generally relates to the fields of microfluidic chip, detection and analysis of biological molecules, chemical analysis, and biological and medical examination. In certain aspects, the present disclosure relates to an integrated microfluidic chip and methods of use.

BACKGROUND

The microfluidic chip technology integrates the basic operating units such as sample preparation, reaction, separation and detection during the biological, chemical and medical analysis process into a micron-scale chip, typically to complete the whole analysis process automatically. In addition, microfluidic chip is a hotspot in the development of Micro Total Analysis Systems (µ-TAS). The microfluidic chip technology uses the microfluidic chip as an operating platform, in combination with biological, chemical, and/or drug screening technologies. Typically, the platform is capable of completing the majority of steps in a whole analytical process, including but not limited to reagent loading, separation, reaction, and/or detection. In recent years, with the rapid development of bio-chip technology, microfluidic chips play more and more important roles in the area of life science, analytical chemistry, and medicine.

For high-efficiency, rapid, and high-throughput detection of samples, chips typically need to have multiple reaction chambers and an effective transmission mode which can convey the samples or reagents to the reaction chambers. In general, microfluidic chips deliver the sample to the internal wells, channels, or holes in the chips by using external forces such as electromagnetic force, centrifugal force, and so on. The microfluidic chip is the main platform for the realization of microfluidic technology, which is primarily characterized in that its effective structures (channel, reaction chamber/cell and other functional components) accommodating fluid belong to a micron scale in at least one dimension. The microfluidic chip has many advantages including controllable liquid flow, few sample and reagent consumption, and fast analysis speed, etc.

The smooth flow and even distribution of a sample and/or a reagent in parallel reaction volumes are important for high throughput, high sensitivity, and high accuracy reagent delivery and analysis. However, how to enable a sample to smoothly flow in the predetermined channel(s) of a microfluidic chip remains a technical challenge that urgently needs to be solved. The present disclosure solves this and related needs.

SUMMARY

The summary is not intended to be used to limit the scope of the claimed subject matter. Other features, details, utilities, and advantages of the claimed subject matter will be apparent from the detailed description including those aspects disclosed in the accompanying drawings and in the appended claims.

Generally, a microfluidic chip comprises chambers that are connected through microchannels. External supporting equipment can provide power to allow samples to successively enter and exit the various channels and/or chambers during the analysis, e.g., during the process of sample/reagent delivery, reaction, and analysis. However, in practice, it is often found that the residual air in a channel or chamber is compressed as more liquid enters the channel or chamber, and the air pressure in the channel or chamber rises. As a result, a sample or reagent in a channel or chamber is often unable to completely and/or smoothly flow to the next channel or chamber. In cases where there are multiple chambers, such as a sample chamber, a mixing chamber, and a reaction chamber on the chip, it is often the case that a sample or reagent in the sample chamber is unable to completely and/or smoothly flow into the mixing chamber, and/or that a sample or reagent in the mixing chamber is unable to completely and/or smoothly flow into the reaction chamber. As a result, efficient and smooth fluid flow in the microchip is hindered by the pressure imbalance.

In one aspect, the present disclosure provides an integrated microfluidic chip, to ensure samples can flow smoothly in a predetermined route comprising one or more channels and/or one or more chambers of the microfluidic chip, and can finally produce one or more target products. In one aspect, the integrated microfluidic chip ensures the air pressure balance in the sample cell and the mixing cell. Therefore, it also ensures the smooth flow of samples in the predetermined channel of the microfluidic chip, thus providing a reliable foundation for producing target products.

In one aspect, to solve the above technical issue, at least one integrated reaction unit is provided on the substrate of the integrated microfluidic chip, and the integrated reaction unit comprises at least a sample cell, a mixing cell, and a reaction cell connected through channels for liquid communication. In one aspect, one end of the sample cell is provided with a sample inlet. In another aspect, the sample cell further comprises an internal circulating system of air circuit. In one embodiment, one end of the internal circulating system of air circuit is connected with the mixing cell, while the other end comprises at least a first circulation branch circuit connected with the end of the sample cell that is far away from or distal to the sample inlet.

In one embodiment, an exhaust vent that can be controllably opened and/or closed is provided on the first circulation branch circuit, and the internal circulating system of air circuit is provided with a liquid blocking structure for blocking liquid at the position near to or proximal to the mixing cell.

In one embodiment, the integrated microfluidic chip is a centrifugal microfluidic chip with a rotation center. The distances of the sample cell, the mixing cell, and the reaction cell from the rotation center are increased successively. In this example, a sample and/or reagent within the microfluidic chip can flow in a predetermined direction, from the sample inlet, through the sample chamber, the mixing chamber, optionally a distribution channel and a buffering chamber, and finally to the reaction chamber. One or more chambers can also be provided after the reaction chamber, for example, for sedimentation and/or collection of a sample, reagent, product, and/or by-product.

In one embodiment, the integrated microfluidic chip further comprises a buffering pool/chamber arranged between the reaction cell and the mixing cell.

In one embodiment, there are at least two reaction cells, and the distances between these reaction cells and the rotation center are substantially the same, and the mixing cell is connected with the reaction cells through one or more distribution channels.

In one embodiment, the distribution channel is of a wave shape. In one aspect, the crest of the wave is close to the rotation center, and the trough of the wave is far away from the rotation center. In some embodiments, the wave-shaped distribution channel comprises a plurality of crests and/or a plurality of troughs. In one aspect, a reaction cell is connected with a trough of the distribution channel, and the mixing cell is connected with the one end, such as the head end, of the distribution channel. The head and tail of the distribution channel can be determined in terms of the direction of liquid flow—liquid enters at the head end and flows toward the tail end.

In one aspect, one end of the internal circulating system of air circuit further comprises a second circulation branch circuit connected with the tail end of the distribution channel.

In one aspect, the point connecting the internal circulating system of air circuit and the mixing chamber is called a first connection point, the point connecting the first circulation branch circuit and the second circulation branch circuit in the internal circulating system of air circuit is called a second connection point, and the distance between the first connection point and the rotation center is larger than that between the second connection point and the rotation center.

In one aspect, a waste liquid pool is connected respectively at the head end and/or the tail end of the distribution channel. For example, the waste liquid pool can be connected to one or more troughs adjacent to the head end, or connected to one or more troughs adjacent to the tail end of the distribution channel.

In one aspect, a first liquid blocking structure is further arranged on the circulation branch circuit. In one embodiment, the first liquid blocking structure is a first volume expanding chamber with a sudden volume change. In another aspect, the internal circulating system of air circuit is further provided with a second liquid blocking structure for blocking liquid at the position close to the mixing cell. In one embodiment, the second liquid blocking structure is the second volume expanding chamber for a sudden volume change. In some embodiments, the liquid blocking structure is made from one or more hydrophobic materials, or comprises a hydrophobic layer that is applied inside the liquid blocking structure.

In one aspect, the microfluidic chip further comprises a sedimentation tank connected with the reaction cell, and its distance from the rotation center is larger than that between the reaction cell and the rotation center.

In yet another aspect, the mixing cell of the microfluidic chip comprises a sleeve provided on one side of the substrate; at least two micropores provided on the substrate and connected with the sleeve interior; a rotor engaging the sleeve and coordinating with the top surface of the sleeve that is distal to the substrate, and a choke plug provided on the rotor for blocking and opening any one of the micropores. In one embodiment, the at least two micropores run through two sides of the substrate and are connected to the sample chamber and/or the distribution channel, for example, through one or more channels or tubes external to the substrate. In another embodiment, the at least two micropores have opening on the surface of the substrate facing the interior of the sleeve, and the other end of each micropore is connected to a channel within the substrate, which internal channel may in turn connect to the sample chamber and/or the distribution channel directly or indirectly, for example, through one or more channels or tubes external to the substrate.

In one aspect, the microfluidic chip comprises multiple sample cells connected in parallel, and all of the sample cells are connected with the mixing cell. In another aspect, the microfluidic chip comprises multiple mixing cells connected in series.

In one aspect, the connection point between the internal circulating system of air circuit and the mixing cell is the exhaust vent of the mixing cell, and the sample inflow hole of the mixing cell is a liquid inlet hole on the mixing cell. In one embodiment, the distance between the liquid inlet hole (e.g., 14 in FIG. 1) and the rotation center is larger than that between the exhaust vent (e.g., 15 in FIG. 1) and the rotation center.

In one aspect, a buffer zone is provided. In one embodiment, one end of the buffer zone is connected with the first circulation branch circuit and the other end is connected with the sample cell. The buffer zone can serve as a liquid-stopping structure to prevent liquid in the sample chamber from entering the air circuit.

In one aspect, one or more reaction reagents are provided, for example, pre-embedded, in the sample cell, the mixing cell, and/or the reaction cell.

In one aspect, the substrate comprises a material selected from the group consisting of glass, silicon, metal, and polymer, and any combination thereof.

In one aspect, the encapsulation or bonding method of the substrate and its corresponding cover plate is chosen from hot pressing, gluing, laser welding, ultrasonic welding, thread screwing, or any combination thereof.

In one aspect of the present technical solution, at least one integrated reaction unit is provided on the substrate of the integrated microfluidic chip. In one embodiment, the integrated reaction unit comprises at least a sample cell connected to a mixing cell, which is in turn connected to a reaction cell. In an addition aspect, an air circuit circulating system is provided, of which one end is connected with the mixing cell, and the other end at least comprises a first circulation branch circuit connected with the sample cell.

In one aspect, when adding samples to the sample inlet of the sample cell, air in the sample cell will first be driven to the mixing cell through the liquid channel, and after performing centrifugation at a low speed, the liquid in the sample cell is gradually transferred to the mixing cell. At this moment, the area that is formerly occupied by the liquid samples in the sample cell is vacant, so the air pressure in the sample cell will be lowered, and the pressure of air that is previously transferred to the mixing cell will rise as the liquid enters. As the two ends of the internal circulating system of air circuit are connected with the mixing cell and the sample cell respectively, the air in the mixing cell can return to the sample cell along the internal circulating system of air circuit under the action of the pressure difference, which ensures the air pressure balance in the sample cell and the mixing cell, and ensures samples can smoothly flow in the predetermined channel of the microfluidic chip under the action of a small centrifugal force, and also, avoids the impact of fast-flowing samples on the mixing cell inlet under a greater centrifugal force, thus providing a reliable foundation for producing target products. Similarly, when samples go through the mixing cell and flow into the distribution channel, air in the distribution channel exit the channel through the internal air circuit and return to the mixing cell. This ensures that the mixed samples can fully fill all distribution channels or the entire length of the same distribution channel, and avoids the situation that the mixed samples enter the reaction cell loaded with different reactants before filling the distribution channels under the high speed centrifugation, thus causing contamination and/or premature reaction.

In one aspect, disclosed herein is a microfluidic chip, comprising a substrate and an integrated unit on the substrate. In one embodiment, the integrated unit comprises: (1) a sample chamber, a mixing chamber, and a reaction chamber, and the sample chamber is configured to form a first fluid connection with the mixing chamber, and the mixing chamber is configured to form a second fluid connection with the reaction chamber; and (2) a circuit configured to provide an air connection between the sample chamber and the mixing chamber. In one embodiment, the first fluid connection and/or the second fluid connection is formed via a liquid flow channel.

In any of the preceding embodiments, the sample chamber can comprise a sample inlet. In one embodiment, a first path of the circuit is connected to the sample chamber at a position distal to the sample inlet. In another embodiment, the first path comprises a first liquid-blocking structure connected to the sample chamber. For example, the first liquid-blocking structure comprises a hydrophobic material. In yet another embodiment, the first path comprises a second liquid-blocking structure connected to the mixing chamber, for example, the second liquid-blocking structure comprises a hydrophobic material.

In any of the preceding embodiments, the first liquid-blocking structure and/or the second liquid-blocking structure can comprise a chamber with expanded volume. In any of the preceding embodiments, the inner surface of the chamber can be coated with a hydrophobic material.

In any of the preceding embodiments, the first path can comprise a first exhaust vent. In any of the preceding embodiments, the first exhaust vent can be configured to open and close. In one embodiment, the first path comprises a first segment, a second segment, and a third segment, arranged sequentially in the direction from the mixing chamber to the sample chamber. In another embodiment, the first exhaust vent is at the junction between the second and third segments. In any of the preceding embodiments, the cross section of the second segment can be larger than the cross section of the first and/or third segment.

In any of the preceding embodiments, the microfluidic chip can be a microfluidic chip configured to rotate around a rotation center, such as a centrifugal microfluidic chip. In one embodiment, the sample chamber, the mixing chamber, and the reaction chamber are arranged in the microfluidic chip in increasing distances from the rotation center. In another embodiment, the reaction chamber is connected to a sedimentation chamber located further away from the rotation center.

In any of the preceding embodiments, the microfluidic chip can comprise a plurality of reaction chambers arranged in substantially the same distance to the rotation center.

In any of the preceding embodiments, the microfluidic chip can comprise a distribution channel between the mixing chamber and the reaction chamber(s). In any of the preceding embodiments, the microfluidic chip can comprise a buffering chamber between the distribution channel and the reaction chamber(s). In any of the preceding embodiments, the mixing chamber can be connected to one end of the distributing channel, and the other end of the distribution channel can be connected to the circuit, for example, via a second path of the circuit. In embodiment, one or both ends of the distribution channel is connected to a waste chamber, for example, via one or more buffering chambers.

In any of the preceding embodiments, the first path can be connected to the mixing chamber at a first connection point, the second path can be connected to the first path at a second connection point, and the second connection point can be closer in distance to the rotation center than the first connection point to the rotation center. In one embodiment, the sample chamber is connected to the mixing chamber at a third connection point, and the first connection point is closer in distance to the rotation center than the third connection point to the rotation center.

In any of the preceding embodiments, the second path can comprise a third liquid-blocking structure connected to the distribution channel. In one embodiment, the third liquid-blocking structure comprises a hydrophobic material. In another embodiment, the third liquid-blocking structure comprises a chamber with expanded volume. In a particular embodiment, the inner surface of the chamber is coated with a hydrophobic material.

In any of the preceding embodiments, the distribution channel can be wave-shaped and can comprise at least one peak and at least one valley. In one embodiment, the at least one peak points toward the rotation center. In another embodiment, the at least one valley points away from the rotation center. In still another embodiment, the at least one peak is closer to the rotation center than the at least one valley to the rotation center.

In any of the preceding embodiments, the at least one valley can be connected to each of the reaction chamber(s).

In any of the preceding embodiments, the mixing chamber can comprise: a sleeve disposed on the substrate; a rotor disposed within the sleeve, and the rotor, the sleeve, and the substrate enclose a space within the mixing chamber; two apertures on the substrate, each configured to form a fluid connection between the mixing chamber and the sample chamber or the distributing channel, e.g., via a channel; and/or a structure disposed on the rotor and extending toward the substrate, and the structure is configured to block or close one or both apertures.

In any of the preceding embodiments, the microfluidic chip can comprise a plurality of the sample chambers connected in parallel, and each sample chamber is connected to the same mixing chamber.

In any of the preceding embodiments, the microfluidic chip can comprise a plurality of the sample chambers connected in series between the sample chamber and the distribution channel.

In any of the preceding embodiments, the sample chamber, the mixing chamber, and/or the reaction chamber can comprise one or more reagents, for example, deposited or pre-embedded in the chamber(s).

In any of the preceding embodiments, the substrate can comprise a material selected from the group consisting of a glass, silicon, a metal or alloy, a polymer, and any combination thereof.

In any of the preceding embodiments, the microfluidic chip can be manufactured by bonding a cover plate to the substrate, for example, by hot pressing, gluing, laser welding, ultrasonic welding, screwing, molding as one piece, fixed integrally injection molding, or any combination thereof.

In another aspect, disclosed herein is a microfluidic chip according to any one of embodiments 1-23.

In still another aspect, disclosed herein is a system, comprising the microfluidic chip of any one of the preceding embodiments. In one embodiment, the system further comprises a means for detecting a reaction in the microfluidic chip.

In one other embodiment, disclosed herein is a kit, comprising the microfluidic chip of any one of the preceding embodiments. In one embodiment, the kit further comprises one or more reagents for performing a reaction in the microfluidic chip, and/or one or more reagents for detecting a reaction in the microfluidic chip.

In yet another aspect, disclosed herein is a method of analyzing an analyte, comprising: 1) loading a sample into the sample chamber of the microfluidic chip of any one of the preceding embodiments; 2) rotating the microfluidic chip around a rotation center; 3) performing a reaction in the reaction chamber; and 4) measuring an indicator of the reaction. In one embodiment of the method, the indicator indicates the presence, absence, amount, and/or a property of an analyte in the sample. In another embodiment, by rotating the chip, the sample is delivered from the sample chamber to the mixing chamber, mixed in the mixing chamber, and/or delivered from the mixing chamber to the reaction chamber.

In any of the preceding embodiments, the sample can be a biological sample, such as a sample derived from a tissue or a body fluid, for example, a connective, epithelium, muscle or nerve tissue; a tissue selected from the group consisting of brain, lung, liver, spleen, bone marrow, thymus, heart, lymph, blood, bone, cartilage, pancreas, kidney, gall bladder, stomach, intestine, testis, ovary, uterus, rectum, nervous system, gland, and internal blood vessels; or a body fluid selected from the group consisting of blood, urine, saliva, bone marrow, sperm, an ascitic fluid, and any sub-fraction thereof, e.g., serum or plasma.

In any of the preceding embodiments, the reaction can be a biological reaction, a chemical reaction, an immune reaction, a nucleic acid amplification reaction such as a PCR reaction, or a polynucleotide/polypeptide sequencing reaction.

Figure 1:
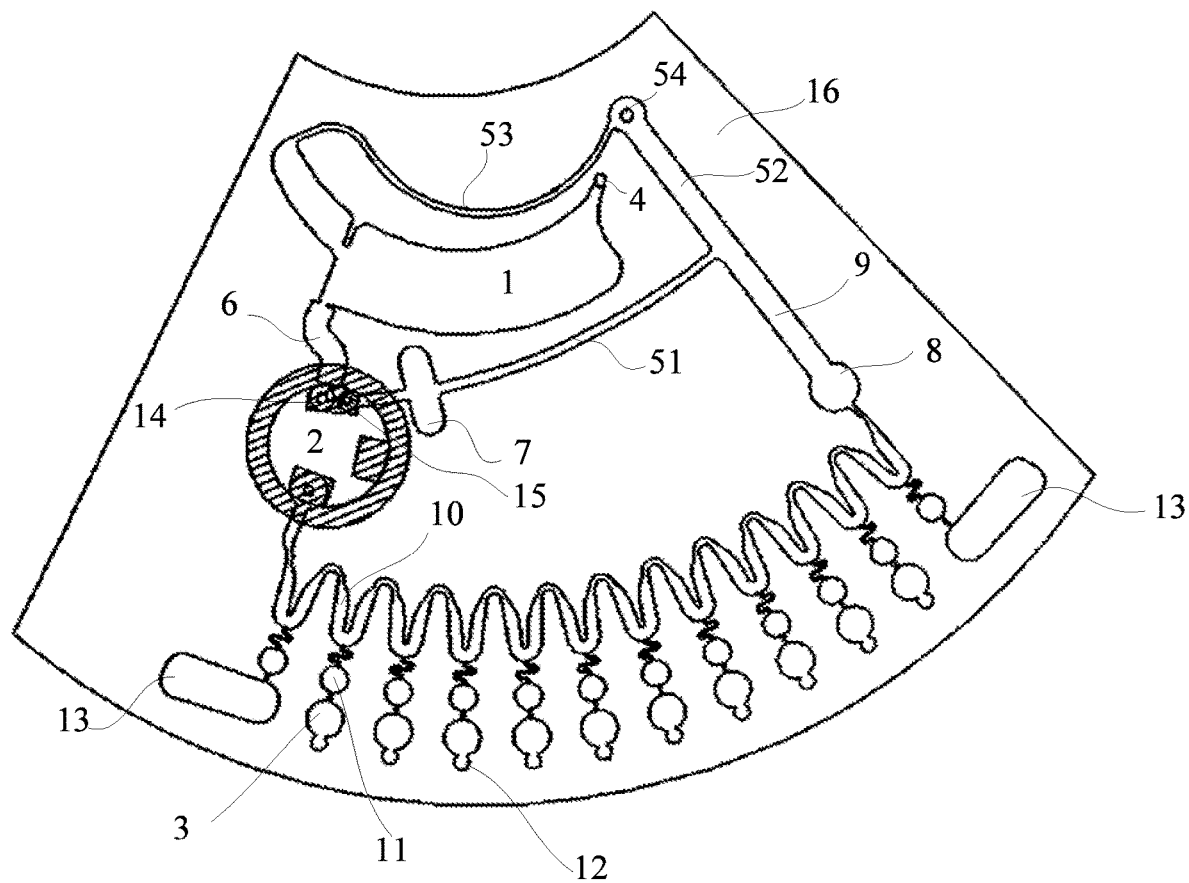
FIG. 1 is a structural diagram of an integrated reaction unit of an integrated microfluidic chip, in one embodiment of the present disclosure.

In the above figures, 1 is a sample chamber/cell; 2 is a mixing chamber/cell; 3 is a reaction chamber/cell; 4 is a sample inlet; 51 is a first segment of a first path connecting the mixing chamber to the sample chamber; 52 is a second segment of the first path connecting the mixing chamber to the sample chamber; 53 is a third segment of the first path connecting the mixing chamber to the sample chamber; 54 is an exhaust vent located at the junction of the send and third segments of the first path; 6 is a liquid channel connecting the sample chamber to the mixing chamber; 7 is a chamber with expanded volume compared to the remaining portion of the first segment, in order to reduce or block liquid flow from the mixing chamber; 10 is a distribution channel; 8 is another chamber with expanded volume, in order to reduce or block liquid flow from the distribution channel into the circuit configured to provide an air connection between the sample chamber and the mixing chamber; 9 is a second path of the circuit, which path connects the distribution channel to the first path; 11 is a buffer pool (also referred to as a buffering chamber); 12 is a sedimentation chamber/tank; 13 is waste liquid pool (also referred to as a waste chamber); 14 is an inlet for the mixing chamber/cell, for directing liquid flow from the sample chamber into the mixing chamber, 15 is an exhaust vent for the mixing chamber/cell, for air connection to the circuit; 16 is a substrate for the microfluidic chip; 17 is a chip tray; 18 is a sleeve; 19 is a rotor; 20 is a micropore; 21 is a structure on the rotor, such as a choke plug; and 22 is a microchannel.

DETAILED DESCRIPTION

A detailed description of one or more embodiments of the claimed subject matter is provided below along with accompanying figures that illustrate the principles of the claimed subject matter. The claimed subject matter is described in connection with such embodiments, but is not limited to any particular embodiment. It is to be understood that the claimed subject matter may be embodied in various forms, and encompasses numerous alternatives, modifications and equivalents. Therefore, specific details disclosed herein are not to be interpreted as limiting, but rather as a basis for the claims and as a representative basis for teaching one skilled in the art to employ the claimed subject matter in virtually any appropriately detailed system, structure, or manner. Numerous specific details are set forth in the following description in order to provide a thorough understanding of the present disclosure. These details are provided for the purpose of example and the claimed subject matter may be practiced according to the claims without some or all of these specific details. It is to be understood that other embodiments can be used and structural changes can be made without departing from the scope of the claimed subject matter. It should be understood that the various features and functionality described in one or more of the individual embodiments are not limited in their applicability to the particular embodiment with which they are described. They instead can, be applied, alone or in some combination, to one or more of the other embodiments of the disclosure, whether or not such embodiments are described, and whether or not such features are presented as being a part of a described embodiment. For the purpose of clarity, technical material that is known in the technical fields related to the claimed subject matter has not been described in detail so that the claimed subject matter is not unnecessarily obscured.

Unless defined otherwise, all terms of art, notations and other technical and scientific terms or terminology used herein are intended to have the same meaning as is commonly understood by one of ordinary skill in the art to which the claimed subject matter pertains. In some cases, terms with commonly understood meanings are defined herein for clarity and/or for ready reference, and the inclusion of such definitions herein should not necessarily be construed to represent a substantial difference over what is generally understood in the art. Many of the techniques and procedures described or referenced herein are well understood and commonly employed using conventional methodology by those skilled in the art.

All publications, including patent documents, scientific articles and databases, referred to in this application are incorporated by reference in their entireties for all purposes to the same extent as if each individual publication were individually incorporated by reference. If a definition set forth herein is contrary to or otherwise inconsistent with a definition set forth in the patents, patent applications, published applications or other publications that are herein incorporated by reference, the definition set forth herein prevails over the definition that is incorporated herein by reference. Citation of the publications or documents is not intended as an admission that any of them is pertinent prior art, nor does it constitute any admission as to the contents or date of these publications or documents.

All headings are for the convenience of the reader and should not be used to limit the meaning of the text that follows the heading, unless so specified.

Throughout this disclosure, various aspects of the claimed subject matter are presented in a range format. It should be understood that the description in range format is merely for convenience and brevity and should not be construed as an inflexible limitation on the scope of the claimed subject matter. Accordingly, the description of a range should be considered to have specifically disclosed all the possible sub-ranges as well as individual numerical values within that range. For example, where a range of values is provided, it is understood that each intervening value, between the upper and lower limit of that range and any other stated or intervening value in that stated range is encompassed within the claimed subject matter. The upper and lower limits of these smaller ranges may independently be included in the smaller ranges, and are also encompassed within the claimed subject matter, subject to any specifically excluded limit in the stated range. Where the stated range includes one or both of the limits, ranges excluding either or both of those included limits are also included in the claimed subject matter. This applies regardless of the breadth of the range.

The practice of the provided embodiments will employ, unless otherwise indicated, conventional techniques and descriptions of organic chemistry, polymer technology, molecular biology (including recombinant techniques), cell biology, biochemistry, and sequencing technology, which are within the skill of those who practice in the art. Such conventional techniques include polypeptide and protein synthesis and modification, polynucleotide synthesis and modification, polymer array synthesis, hybridization and ligation of polynucleotides, and detection of hybridization using a label. Specific illustrations of suitable techniques can be had by reference to the examples herein. However, other equivalent conventional procedures can, of course, also be used. Such conventional techniques and descriptions can be found in standard laboratory manuals such as Green, et al., Eds., *Genome Analysis: A Laboratory Manual Series* (Vols. I-IV) (1999); Weiner, Gabriel, Stephens, Eds., *Genetic Variation: A Laboratory Manual* (2007); Dieffenbach, Dveksler, Eds., *PCR Primer: A Laboratory Manual* (2003); Bowtell and Sambrook, *DNA Microarrays: A Molecular Cloning Manual* (2003); Mount, *Bioinformatics: Sequence and Genome Analysis* (2004); Sambrook and Russell, *Condensed Protocols from Molecular Cloning: A Laboratory Manual* (2006); and Sambrook and Russell, *Molecular Cloning: A Laboratory Manual* (2002) (all from Cold Spring Harbor Laboratory Press); Ausubel et al. eds., *Current Protocols in Molecular Biology* (1987); T. Brown ed., *Essential Molecular Biology* (1991), IRL Press; Goeddel ed., *Gene Expression Technology* (1991), Academic Press; A. Bothwell et al. eds., *Methods for Cloning and Analysis of Eukaryotic Genes* (1990), Bartlett Publ.; M. Kriegler, *Gene Transfer and Expression* (1990), Stockton Press; R. Wu et al. eds., *Recombinant DNA Methodology* (1989), Academic Press; M. McPherson et al., *PCR: A Practical Approach* (1991), IRL Press at Oxford University Press; Stryer, *Biochemistry* (4th Ed.) (1995), W. H. Freeman, New York N.Y.; Gait, *Oligonucleotide Synthesis: A Practical Approach* (2002), IRL Press, London; Nelson and Cox, *Lehninger, Principles of Biochemistry* (2000) 3rd Ed., W. H. Freeman Pub., New York, N.Y.; Berg, et al., *Biochemistry* (2002) 5th Ed., W. H. Freeman Pub., New York, N.Y.; D. Weir & C. Blackwell, eds., *Handbook of Experimental Immunology* (1996), Wiley-Blackwell; A. Abbas et al., *Cellular and Molecular Immunology* (1991, 1994), W.B. Saunders Co.; and J. Coligan et al. eds., *Current Protocols in Immunology* (1991), all of which are herein incorporated in their entireties by reference for all purposes.

A. Definitions

As used herein and in the appended claims, the singular forms "a," "an," and "the" include plural referents unless the context clearly dictates otherwise. For example, "a" or "an" means "at least one" or "one or more." Thus, reference to "a reagent" refers to one or more reagents, and reference to "the method" includes reference to equivalent steps and methods disclosed herein and/or known to those skilled in the art, and so forth.

As used herein, the term "microfluidic device" generally refers to a device through which materials, particularly fluid borne materials, such as liquids, can be transported, in some embodiments on a micro-scale, and in some embodiments on a nanoscale. Thus, the microfluidic devices described by the presently disclosed subject matter can comprise microscale features, nanoscale features, and combinations thereof.

Accordingly, an exemplary microfluidic device typically comprises structural or functional features dimensioned on the order of a millimeter-scale or less, which are capable of manipulating a fluid at a flow rate on the order of a µL/min or less. Typically, such features include, but are not limited to channels, fluid reservoirs, reaction chambers, mixing chambers, and separation regions. In some examples, the channels include at least one cross-sectional dimension that is in a range of from about 0.1 µm to about 500 µm. The use of dimensions on this order allows the incorporation of a greater number of channels in a smaller area, and utilizes smaller volumes of fluids.

A microfluidic device can exist alone or can be a part of a microfluidic system which, for example and without limitation, can include: pumps for introducing fluids, e.g., samples, reagents, buffers and the like, into the system and/or through the system; detection equipment or systems; data storage systems; and control systems for controlling fluid transport and/or direction within the device, monitoring and controlling environmental conditions to which fluids in the device are subjected, e.g., temperature, current, and the like.

As used herein, the terms "channel," "micro-channel," "fluidic channel," and "microfluidic channel" are used interchangeably and can mean a recess or cavity formed in a material by imparting a pattern from a patterned substrate into a material or by any suitable material removing technique, or can mean a recess or cavity in combination with any suitable fluid-conducting structure mounted in the recess or cavity, such as a tube, capillary, or the like. In the present invention, channel size means the cross-sectional area of the microfluidic channel.

As used herein, the terms "flow channel" and "control channel" are used interchangeably and can mean a channel in a microfluidic device in which a material, such as a fluid, e.g., a gas or a liquid, can flow through. More particularly, the term "flow channel" refers to a channel in which a material of interest, e.g., a solvent or a chemical reagent, can flow through. Further, the term "control channel" refers to a flow channel in which a material, such as a fluid, e.g., a gas or a liquid, can flow through in such a way to actuate a valve or pump.

As used herein, "chip" refers to a solid substrate with a plurality of one-, two- or three-dimensional micro structures or micro-scale structures on which certain processes, such as physical, chemical, biological, biophysical or biochemical processes, etc., can be carried out. The micro structures or micro-scale structures such as, channels and wells, electrode elements, electromagnetic elements, are incorporated into, fabricated on or otherwise attached to the substrate for facilitating physical, biophysical, biological, biochemical, chemical reactions or processes on the chip. The chip may be thin in one dimension and may have various shapes in other dimensions, for example, a rectangle, a circle, an ellipse, or other irregular shapes. The size of the major surface of chips of the present invention can vary considerably, e.g., from about 1 mm$^2$ to about 0.25 m$^2$. Preferably, the size of the chips is from about 4 mm$^2$ to about 25 cm$^2$ with a characteristic dimension from about 1 mm to about 5 cm. The chip surfaces may be flat, or not flat. The chips with non-flat surfaces may include channels or wells fabricated on the surfaces.

As used herein, "substantially identical" or "substantially the same" reaction volumes or distances mean that the differences among the reaction volumes (or the distances) are sufficiently small not to statistically affect assay uniformity. In one embodiment, the volumes of the reaction chambers on the same microfluidic chip are substantially identical. Normally, the difference between the largest volume and the smallest volume is less than about 50% of the largest reaction volume. Preferably, the difference between the largest volume and the smallest volume is less than about 40%, about 30%, about 20%, about 10%, about 5%, about 2%, about 1%, about 0.5%, about 0.1%, about 0.01%, or less than about 0.001% of the largest reaction volume. In another embodiment, the distances of the plurality of sample chambers to the rotation center of the same microfluidic chip are substantially identical or the same. In still another embodiment, the distances of the plurality of mixing chamber to the rotation center of the same microfluidic chip are substantially identical or the same. In yet another embodiment, the distances of the plurality of reaction chambers to the rotation center of the same microfluidic chip are substantially identical or the same. Normally, the difference between the largest distance and the smallest distance is less than about 50% of the largest reaction volume. Preferably, the difference between the largest distance and the smallest distance is less than about 40%, about 30%, about 20%, about 10%, about 5%, about 2%, about 1%, about 0.5%, about 0.1%, about 0.01%, or less than about 0.001% of the largest distance.

As used herein, a "sample" can be a solution, a suspension, liquid, powder, a paste, aqueous, non-aqueous or any combination thereof. A biological sample of the present disclosure encompasses a sample in the form of a solution, a suspension, a liquid, a powder, a paste, an aqueous sample, or a non-aqueous sample. As used herein, a "biological sample" includes any sample obtained from a living or viral (or prion) source or other source of macromolecules and biomolecules, and includes any cell type or tissue of a subject from which nucleic acid, protein and/or other macromolecule can be obtained. The biological sample can be a sample obtained directly from a biological source or a sample that is processed. For example, isolated nucleic acids that are amplified constitute a biological sample. Biological samples include, but are not limited to, body fluids, such as blood, plasma, serum, cerebrospinal fluid, synovial fluid, urine and sweat, tissue and organ samples from animals and plants and processed samples derived therefrom.

The terms "polynucleotide," "oligonucleotide," "nucleic acid" and "nucleic acid molecule" are used interchangeably herein to refer to a polymeric form of nucleotides of any length, and comprise ribonucleotides, deoxyribonucleotides, and analogs or mixtures thereof. The terms include triple-, double- and single-stranded deoxyribonucleic acid ("DNA"), as well as triple-, double- and single-stranded ribonucleic acid ("RNA"). It also includes modified, for example by alkylation, and/or by capping, and unmodified forms of the polynucleotide. More particularly, the terms "polynucleotide," "oligonucleotide," "nucleic acid," and "nucleic acid molecule" include polydeoxyribonucleotides (containing 2-deoxy-D-ribose), polyribonucleotides (containing D-ribose), including tRNA, rRNA, hRNA, and mRNA, whether spliced or unspliced, any other type of polynucleotide which is an N- or C-glycoside of a purine or pyrimidine base, and other polymers containing nonnucleotidic backbones, for example, polyamide (e.g., peptide nucleic acids ("PNAs")) and polymorpholino (commercially available from the Anti-Virals, Inc., Corvallis, Oreg., as Neugene) polymers, and other synthetic sequence-specific nucleic acid polymers providing that the polymers contain nucleobases in a configuration which allows for base pairing and base stacking, such as is found in DNA and RNA. Thus, these terms include, for example, 3'-deoxy-2',5'-DNA, oligodeoxyribonucleotide N3' to P5' phosphoramidates, 2'-O-alkyl-substituted RNA, hybrids between DNA and RNA or between PNAs and DNA or RNA, and also include known types of modifications, for example, labels, alkylation, "caps," substitution of one or more of the nucleotides with an analog, inter-nucleotide modifications such as, for example, those with uncharged linkages (e.g., methyl phosphonates, phosphotriesters, phosphoramidates, carbamates, etc.), with negatively charged linkages (e.g., phosphorothioates, phosphorodithioates, etc.), and with positively charged linkages (e.g., aminoalkylphosphoramidates, aminoalkylphosphotriesters), those containing pendant moieties, such as, for example, proteins (including enzymes (e.g. nucleases), toxins, antibodies, signal peptides, poly-L-lysine, etc.), those with intercalators (e.g., acridine, psoralen, etc.), those containing chelates (of, e.g., metals, radioactive metals, boron, oxidative metals, etc.), those containing alkylators, those with modified linkages (e.g., alpha anomeric nucleic acids, etc.), as well as unmodified forms of the polynucleotide or oligonucleotide. A nucleic acid generally will contain phosphodiester bonds, although in some cases nucleic acid analogs may be included that have alternative backbones such as phosphoramidite, phosphorodithioate, or methylphophoroamidite linkages; or peptide nucleic acid backbones and linkages. Other analog nucleic acids include those with bicyclic structures including locked nucleic acids, positive backbones, non-ionic backbones and non-ribose backbones. Modifications of the ribose-phosphate backbone may be done to increase the stability of the molecules; for example, PNA:DNA hybrids can exhibit higher stability in some environments. The terms "polynucleotide," "oligonucleotide," "nucleic acid" and "nucleic acid molecule" can comprise any suitable length, such as at least 5, 6, 7, 8, 9, 10, 20, 30, 40, 50, 100, 200, 300, 400, 500, 1,000 or more nucleotides.

It will be appreciated that, as used herein, the terms "nucleoside" and "nucleotide" include those moieties which contain not only the known purine and pyrimidine bases, but also other heterocyclic bases which have been modified. Such modifications include methylated purines or pyrimidines, acylated purines or pyrimidines, or other heterocycles. Modified nucleosides or nucleotides can also include modifications on the sugar moiety, e.g., wherein one or more of the hydroxyl groups are replaced with halogen, aliphatic groups, or are functionalized as ethers, amines, or the like. The term "nucleotidic unit" is intended to encompass nucleosides and nucleotides.

The terms "polypeptide," "oligopeptide," "peptide," and "protein" are used interchangeably herein to refer to polymers of amino acids of any length, e.g., at least 5, 6, 7, 8, 9, 10, 20, 30, 40, 50, 100, 200, 300, 400, 500, 1,000 or more amino acids. The polymer may be linear or branched, it may comprise modified amino acids, and it may be interrupted by non-amino acids. The terms also encompass an amino acid polymer that has been modified naturally or by intervention; for example, disulfide bond formation, glycosylation, lipidation, acetylation, phosphorylation, or any other manipulation or modification, such as conjugation with a labeling component. Also included within the definition are, for example, polypeptides containing one or more analogs of an amino acid (including, for example, unnatural amino acids, etc.), as well as other modifications known in the art.

An analyte that can be detected and/or analyzed using the chip disclosed herein can be any biological molecules including but not limited to proteins, nucleic acids, lipids, carbohydrates, ions, or multicomponent complexes containing any of the above. Examples of subcellular analytes of interest include organelles, e.g., mitochondria, Golgi apparatus, endoplasmic reticulum, chloroplasts, endocytic vesicles, exocytic vesicles, vacuoles, lysosomes, etc. Exemplary nucleic acid analyte can include genomic DNA of various conformations (e.g., A-DNA, B-DNA, Z-DNA), mitochondria DNA (mtDNA), mRNA, tRNA, rRNA, hRNA, miRNA, and piRNA.

A sequencing reaction and the like include determination of information relating to the nucleotide base sequence of a nucleic acid. Such information may include the identification or determination of partial as well as full sequence information of the nucleic acid. Sequence information may be determined with varying degrees of statistical reliability or confidence. In one aspect, the term includes the determination of the identity and ordering of a plurality of contiguous nucleotides in a nucleic acid. "High throughput sequencing" or "next generation sequencing" includes sequence determination using methods that determine many (typically thousands to billions) of nucleic acid sequences in an intrinsically parallel manner, i.e. where DNA templates are prepared for sequencing not one at a time, but in a bulk process, and where many sequences are read out preferably in parallel, or alternatively using an ultra-high throughput serial process that itself may be parallelized. Such methods include but are not limited to pyrosequencing (for example, as commercialized by 454 Life Sciences, Inc., Branford, Conn.); sequencing by ligation (for example, as commercialized in the SOLiD™ technology, Life Technologies, Inc., Carlsbad, Calif.); sequencing by synthesis using modified nucleotides (such as commercialized in TruSeq™ and HiSeg™ technology by Illumina, Inc., San Diego, Calif.; HeliScope™ by Helicos Biosciences Corporation, Cambridge, Mass.; and PacBio RS by Pacific Biosciences of California, Inc., Menlo Park, Calif.), sequencing by ion detection technologies (such as Ion Torrent™ technology, Life Technologies, Carlsbad, Calif.); sequencing of DNA nanoballs (Complete Genomics, Inc., Mountain View, Calif.); nanopore-based sequencing technologies (for example, as developed by Oxford Nanopore Technologies, LTD, Oxford, UK), and like highly parallelized sequencing methods.

"Multiplexing," "multiplex assay," or "multi-index assay" herein may refer to an assay or other analytical method in which the presence and/or amount of multiple targets, e.g., multiple nucleic acid sequences, can be assayed simultaneously, for example, by using more than one capture probe conjugate, each of which has at least one different detection characteristic, e.g., fluorescence characteristic (for example excitation wavelength, emission wavelength, emission intensity, FWHM (full width at half maximum peak height), or fluorescence lifetime) or a unique nucleic acid or protein sequence characteristic.

It is understood that aspects and embodiments of the invention described herein include "consisting" and/or "consisting essentially of" aspects and embodiments.

B. Microfluidic Chips and Microfluidic Systems

In one aspect, the present disclosure provides an integrated microfluidic chip, to ensure samples can flow smoothly in a predetermined channel or channels of the microfluidic chip, for example, in order to finally produce target products.

For example, in the integrated microfluidic chip shown in FIG. 1, at least one integrated reaction unit is provided on the substrate 16. In one aspect, the integrated reaction unit comprises at least a sample chamber/cell 1, a mixing chamber/cell 2, and/or a reaction chamber/cell 3. In one embodiment, the sample chamber is used for temporary storage of one or more samples. In one embodiment, the mixing chamber is used as a place where the sample or samples are mixed with one or more other substances. In other embodiments, the reaction chamber is used as a place where the sample or samples react with one or more reagents and finally produce one or more target products. In one aspect, these three chambers can form liquid connections, for example, the chambers are connected through channels. As shown in FIG. 1, the sample chamber can be of an elongated shape, for example, a long strip shape. In one aspect, the sample chamber can be elongated in the rotation direction of the microfluidic chip, around a rotation center. In another aspect, the sample chamber can be of a curved shape. In one aspect, one end of the sample chamber is provided with a sample inlet 4, which can be controllably closed, for example, after a sample is injected. In an additional aspect, the microfluidic chip further comprises an internal circulating system/circuit for air or gas, of which one end is connected to the mixing chamber, and the other end at least comprises a first circulation branch circuit (e.g., the branch comprising segments 52 and 53) connected to the sample chamber, for example, at an end of the sample chamber that is 1 that is distal to the sample inlet 4.

Referring to FIG. 1, when a sample is added into the sample chamber 1 via the sample inlet 4, the air (or a gas) in the sample chamber will first be driven to the mixing chamber 2, for example, through one or more liquid channels such as the liquid channel 6 shown in the figure. In one aspect, with the help of one or more supporting equipment, for example, by rotating the chip, the liquid in the sample chamber is gradually transferred to the mixing chamber. At this moment, the volume or space in the sample chamber that is formerly occupied by the liquid sample is vacant. Since the sample inlet 4 may be closed in order to avoid or reduce contamination, no air from the outside environment will enter the sample chamber to fill the vacant space. As a result, the air pressure in the sample chamber will lower, and the pressure of air that is previously transferred to the mixing chamber will rise as the liquid enters from the sample chamber. Since one end of the internal air circulating system/circuit is connected with the mixing chamber and the other end is connected with the sample chamber, air in the mixing chamber can return to the sample chamber along the internal air circulating system/circuit under the action of the pressure difference. For example, air that has been push into mixing chamber 2 by the liquid sample in sample chamber 1 can exit the mixing chamber via vent 15, travel along segment 51, segment 52, and segment 53, and finally back to the sample chamber. This way, air pressure balance in the sample chamber and the mixing chamber is achieved, and as a result, the sample(s) can smoothly flow in the predetermined direction inside the microfluidic chip, for example, at a low rotating speed. In one aspect, the present chip design also reduces the impact of the sample(s) on the inlet (e.g., inlet 14 in FIG. 1) of the mixing chamber, thus providing a reliable foundation for downstream applications, such as producing one or more target products.

In a further aspect, in order to avoid leaving too much air in the sample chamber, the mixing chamber, and/or the connecting pipes and/or channels (the air circuit circulating channel and the liquid channel) when adding samples, an exhaust vent 54 that can be opened and closed is provided. For example, the exhaust vent can be provided on the first circulation branch circuit. When adding a sample to the sample chamber, the exhaust vent 54 remains open; and after the sample is added, both the sample inlet 4 and the exhaust vent 54 are closed, in order to avoid sample leakage and/or contamination from the outside environment.

In another aspect, to prevent liquid in the mixing chamber from flowing into the internal circulating system of the air circuit, the air circuit further comprises a liquid blocking structure for blocking liquid from entering the air channels. In one embodiment, the liquid blocking structure, such as a chamber with an expanded volume and/or a segment whose internal surface is coated with a hydrophobic material, is arranged at a position proximal to the mixing chamber. As shown in FIG. 1, the liquid blocking structure can be a chamber with an expanded volume—chamber 7—of which the sudden volume change compared to the rest of the channel can collect liquid that enters the air circuit and prevent it from travelling up segments 51, 52, and 53.

Referring to FIG. 1, the first circulation branch circuit in the embodiment comprises two segments, the second segment 52 and the third segment 53. The first path may further comprise the first segment 51 as one end of the internal circulating system of air circuit connected to the mixing chamber, and the third segment 53 connected to the sample chamber, and the second segment 52 being the middle segment connecting the first segment and the third segment. In one embodiment, the flow sections of the first segment 51 and/or the third segment 53 are smaller than that of the second segment 52, to prevent liquid in the sample chamber and/or the mixing chamber from entering the internal air circulating system/circuit.

In another embodiment, in order to prevent a sample from flowing into the internal air circulating system/circuit from the mixing chamber, the internal air circulating system/circuit is provided with a liquid blocking structure at a position proximal to the mixing chamber. In one aspect, the liquid blocking structure can comprise one or more valves. In another aspect, a chamber with expanded volume such as chamber 7 is provided as the liquid-blocking structure. In one aspect, the pipe/channel with a sudden volume change along its path can effectively block the liquid flow, thus preventing a liquid sample or sample mixture (with one or more other reagents) from entering the internal air circulating system/circuit.

In one aspect, one or more supporting structure and/or equipment can be used together with the microfluidic chip disclosed herein. For example, the supporting equipment may not only provide power to actuate sample flow in the microfluidic chip, but also actuate the operation of one or more other micro components in the microfluidic chip. Therefore, the sample or samples in the microfluidic chip (abbreviation of the integrated microfluidic chip) can be driven in many different ways. For example, the supporting equipment can provide air or gas to drive the sample(s) to flow, or rotate the microfluidic chip to drive the sample(s) to flow via a centrifugal force. In one aspect, the integrated microfluidic chip is simply a centrifugal microfluidic chip with a rotation center. In this example, to allow the sample(s) to flow from the sample chamber (e.g., chamber 1) to the mixing chamber (e.g., chamber 2) and then to the reaction chamber (e.g., chamber 3) successively under the action of the centrifugal force, the distances of the sample chamber, the mixing chamber, and the reaction chamber to the rotation center increase successively.

It should be noted that, the rotation center can be located on the substrate 16 of the microfluidic chip, or outside of the microfluidic chip. In some embodiments, because the microfluidic chip is often put on a chip tray 17 in the actual centrifugal process, the rotation center can also be on the chip tray.

Figure 2:
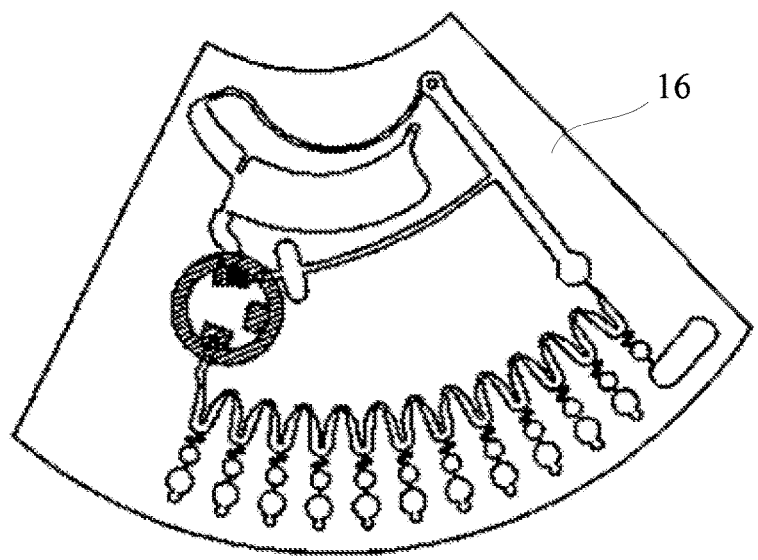
FIG. 2 is a structural diagram of an integrated microfluidic chip, in one embodiment of the present disclosure.
Figure 3:
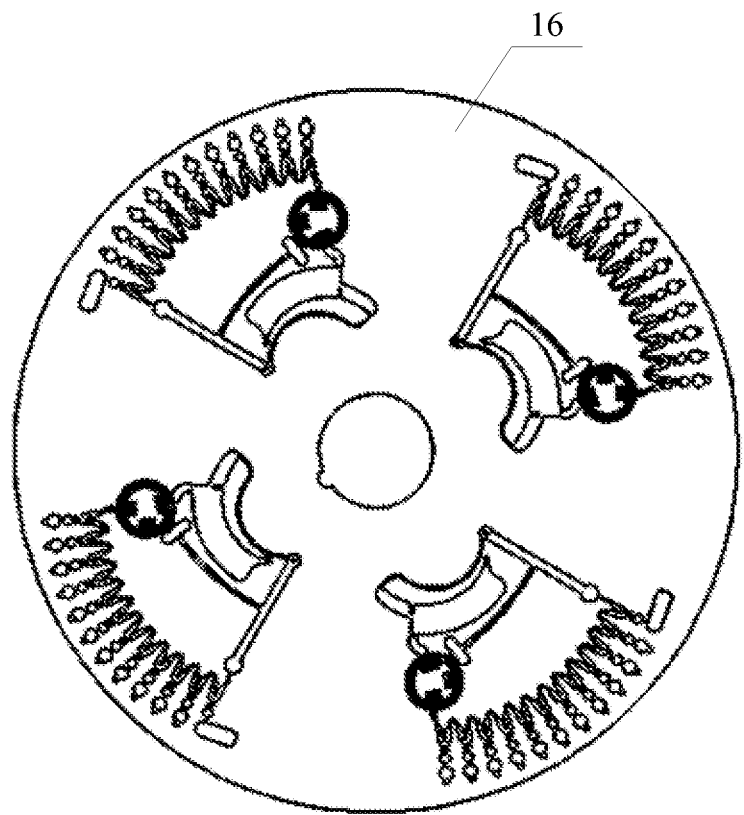
FIG. 3 is a structural diagram of an integrated microfluidic chip, in one embodiment of the present disclosure.
Figure 4:
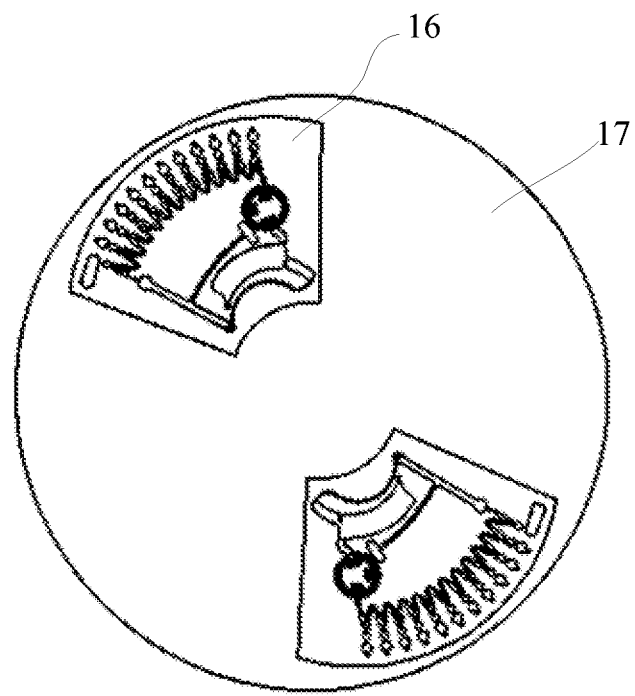
FIG. 4 is a structural diagram of an integrated microfluidic chip, in one embodiment of the present disclosure.

As shown in FIG. 2 to FIG. 4, there can be only one integrated reaction unit on a microfluidic chip, and there can also be two or more integrated reaction units arranged in the microfluidic chip (4 units shown in FIG. 3). In addition, two or more microfluidic chips can be provided (e.g., embedded) in a chip tray 17 (2 chips shown in FIG. 4), and one or more integrated reaction unit(s) can be provided on each microfluidic chip embedded in the chip tray 17.

In a further embodiment, a buffer zone can be provided between the first circulation branch circuit and the sample cell, to play a buffering role when adding a sample to the microfluidic chip or performing other operations. In addition, a special buffer zone may not be provided between the sample cell and the first circulation branch circuit; instead, the first circulation branch circuit is directly connected with the sample cell.

As shown in FIG. 1, in one aspect, to avoid a big impact produced when samples enter the reaction cell, a buffering chamber/pool 11 is provided between the reaction cell 3 and the mixing cell 2, to ensure samples can enter the reaction cell under a slow flow state, for example, at a slow flow rate driven by a slow centrifugation rate of a centrifugal microfluidic chip.

In one aspect, according to different needs, there can be one or more reaction cell(s). When there are more than one reaction cell, the distance between each reaction cell and the rotation center should be the substantially the same, and the mixing cell is connected with these reaction cells through a distribution channel (for example, the wave-shaped channel 10 in FIG. 1). As shown in FIG. 1 to FIG. 4 and FIG. 7 to FIG. 8, the distribution channel is wavy, and the crest of this wavy distribution channel 10 is close to the rotation center and its trough is far from the rotation center. In one aspect, the reaction cell is connected with the trough of the distribution channel, and the mixing cell is connected with the head end of the distribution channel.

In one aspect, as the distribution channel extends along the circumferential direction of the microfluidic chip as a whole, any end of the distribution channel can be its head end, and the other end is its tail end. For example, in an actual design process, the mixing cell only needs to be connected with the closer end of the distribution channel. Thus, this end is the head end of the distribution channel and the other end is the tail end.

In an alternative embodiment, when there are two or more reaction cells, a waste liquid pool 13 can be respectively connected on the troughs adjacent to the head end and the tail end of the distribution channel. In one aspect, the volume of each waste liquid pool is between about 0.5 and about 10 times of that of each reaction cell. In specific examples, the volume of each waste liquid pool is about 0.3, about 0.4, about 0.5, about 0.6, about 0.7, about 0.8, about 0.9, about 1.0, about 2.0, about 2.5, about 3.0, about 3.5, about 4.0, about 4.5, about 5.0, about 5.5, about 6.0, about 6.5, about 7.0, about 7.5, about 8.0, about 8.5, about 9.0, about 9.5, about 10.0, about 10.5, about 11.0 or more than about 11.0 times of that of each reaction cell.

In one aspect, the waste liquid pool close to the mixing cell can be used for accommodating the residual liquid in the mixing cell, and the waste liquid pool distal to the mixing cell can be used for accommodating the redundant liquid in the distribution channel.

As shown in FIG. 1, in one aspect, the other end of the air circuit circulating system further comprises a second circulation branch circuit 9 connected with the tail end of the distribution channel 10. In one aspect, this second circulation branch circuit further permits the internal circulation of air in the distribution channel. Specifically, when samples flow to the distribution channel, air in the distribution channel will first be driven to the second circulation branch circuit (e.g., channel 9 in FIG. 1), and with the help of the supporting equipment, liquid in the mixing cell is gradually transferred to the distribution channel. At this moment, the area that is formerly occupied by the liquid samples in the mixing cell is vacant, so the air pressure in the mixing cell will be lowered, and the pressure of air that is previously transferred to the second circulation branch circuit will rise as the liquid enters. As it is connected with the internal circulating system of air circuit, air in the second circulation branch circuit can be returned to the mixing cell, for example, along the first segment 51 in the internal circulating system of air circuit under the action of the pressure difference. This way, the present microfluidic chip ensures the air pressure balance in the mixing cell and the distribution channel, and further ensures samples can fully fill the distribution channel and smoothly flow in the predetermined channel of the microfluidic chip.

In one aspect, the cross sectional area of the second circulation branch circuit is significantly larger than that of the end of the air circuit internal circulating channel connected with the mixing cell, that is, the cross sectional area of the first segment (e.g., segment 51 in FIG. 1). In particular embodiments, the cross sectional area of segment 52 and/or branch 9 is greater than the cross sectional area of segment 51 and/or segment 53. For example, the cross sectional area of segment 52 and/or branch 9 is about 1.1 times, about 1.5 times, about 2.0 times, about 2.5 times, about 3.0 times, about 3.5 times, or greater, of the cross sectional area of segment 51 and/or segment 53.

Further, in one aspect, in order to prevent samples from flowing into the second circulation branch circuit from the distribution channel, the second circulation branch circuit is provided with a liquid-blocking structure for blocking liquid from the distribution channel. The blocking structure may comprise one or more valves. In addition, the blocking structure may comprise a first volume expanding chamber (e.g., 8 in FIG. 1) for a sudden volume change. In one aspect, the pipe with a sudden area/volume change can effectively block the liquid flow, thus preventing liquid samples from entering the air circulation branch circuit.

In one aspect, to improve the liquid blocking effect, the internal surfaces of the connecting pipes of the sample cell, the mixing cell, the distribution channel, and/or the reaction cell, and the pipe of the internal circulating system of air circuit can also be made from one or more hydrophobic materials or comprise a hydrophobic coating. Any suitable hydrophobic materials and/or hydrophobic coating known in this field may be used. In particular embodiments, both the first liquid blocking structure (e.g., 8 in FIG. 1) and the second liquid blocking structure (e.g., 7 in FIG. 1) are made from hydrophobic materials, or their inner walls are applied or coated with hydrophobic materials, to achieve an ideal liquid blocking effect.

As shown in FIG. 1, in one aspect, the point connecting the internal circulating system of air circuit and the mixing cell 2 is called the first connection point, and the point connecting the internal circulating system of air circuit and the first circulation branch circuit or the second circulation branch circuit 9 is called the second connection point. In one aspect, the distance between the first connection point and the rotation center is larger than that between the second connection point and the rotation center. This design makes the internal circulating system of air circuit show an eccentric state, which can effectively prevent the liquid in the mixing cell 2 from entering the internal circulating system of air circuit, and thus ensuring the normal operation of the internal circulating system of air circuit.

As shown in FIG. 1, in one aspect, a sedimentation tank 12 can also be provided on the tail end of the reaction cell 3, and the distance between the sedimentation tank 12 and the rotation center is larger than that between the reaction cell 3 and the rotation center. In one aspect, the sedimentation tank is used for collecting solid contents of the solution in the reaction cell 3, such as any precipitant (such as immunocomplexes) that may form as a result of the reaction or solid support (such as microbeads or gold particles) that may be used in the reaction. In one aspect, the volume of the sedimentation chamber is between about 0.05 and about 1 time of that of the reaction cell. In particular embodiments, the volume of the sedimentation chamber is about 0.01, about 0.05, about 0.1, about 0.2, about 0.5, about 1.0, or about 1.5 times of that of the reaction chamber.

Figure 5:
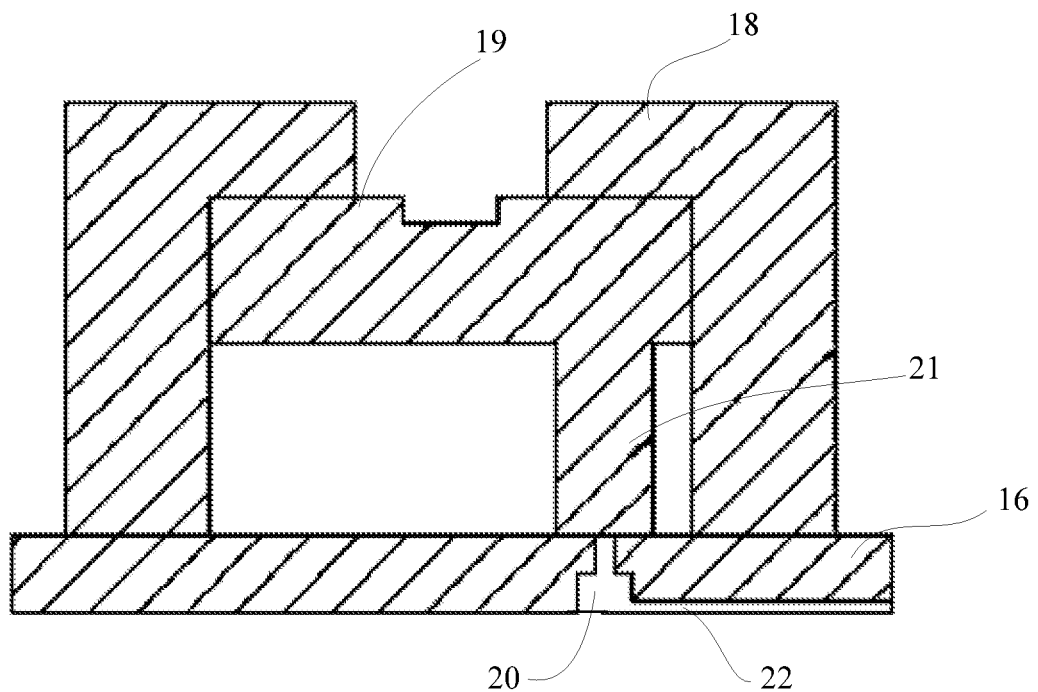
FIG. 5 is a structural diagram of a mixing chamber or cell, in one embodiment of the present disclosure.

In one aspect, FIG. 5 shows the structural diagram of a mixing cell of the presently disclosed microfluidic chip. In one embodiment, the mixing cell comprises a sleeve 18, micropores 20 and a rotor 19, wherein the sleeve bulges on one side of the substrate 16, and there are at least two micropores 20. In one embodiment, the micropores run through the two sides of the substrate 16. In one aspect, the interior of the sleeve 18 is connected with a microchannel 22. In one aspect, the rotor 19 is embedded in the sleeve and coordinates with the top surface of the sleeve that is far from the substrate, and a choke plug 21 for blocking and opening any micropore 20 is provided on the rotor 19.

In one aspect, the mixing cell/chamber herein and/or its arrangement on a microfluidic chip is as disclosed in International Patent Application No. PCT/CN2016/000549, filed Sep. 30, 2016, entitled "A microfluidic valve and a chip or system comprising the microfluidic valve," the content of which is incorporated herein by reference in its entirety for all purposes.

In one aspect, provided herein is a microfluidic valve and a microfluidic chip comprising the valve, the microfluidic valve comprising: a base, wherein an aperture, e.g., a micropore, is provided in the base; a sleeve disposed on the base; a rotatable rotor disposed within the sleeve, located on the end of the sleeve away from the base, wherein the rotor, the sleeve, and the base form a mixing chamber. In one aspect, the micropore is configured to communicate or capable of communicating with the mixing chamber. In one aspect, a micro-column is disposed on the rotor and located in the mixing chamber. In some embodiments, the micropore can be closed by the micro-column.

In another aspect, the present disclosure provides a microfluidic valve, which through the rotation of the rotor, not only can function as an on/off switch of the aperture, e.g., the micropore, provided on the base, but also can mix and/or agitate a liquid in the mixing chamber. Therefore, in one aspect, the microfluidic valve not only controls on-off of flow path but also stirs the fluid, so as to reduce the number of parts provided in a micro-fluidic chip and facilitate assembly.

In one other aspect, provided herein is a microfluidic valve which comprises a base, the base comprising an aperture, e.g., a micropore. In one embodiment, the microfluidic valve further comprises a sleeve disposed on the base.

In any of the preceding embodiments, a rotatable rotor can be disposed within the sleeve. In any of the preceding embodiments, the rotor can be disposed on the end of the sleeve away from of the base. In any of the preceding embodiments, the rotor, the sleeve, and the base can form a mixing chamber. In any of the preceding embodiments, the aperture, e.g., the micropore, is configured to communicate or capable of communicating with the mixing chamber. In any of the preceding embodiments, a micro-column can be disposed on the rotor and located in the mixing chamber. In any of the preceding embodiments, the micro-column can block or close the communication between the micropore and the mixing chamber.

In any of the preceding embodiments, the rotor, on its end surface away from the base, can comprise an interface structure for rotating the rotor. In any of the preceding embodiments, the interface structure can optionally comprise a bump, a groove, or a combination thereof for rotating the rotor.

In any of the preceding embodiments, the sleeve, on its end away from the base, can comprise an inward annular protuberance. In one aspect, the inward annular protuberance secures the position of the rotor inside the sleeve along the axis of the sleeve.

In any of the preceding embodiments, the end surface of the sleeve away from the base can be flush with or higher than the end surface of the rotor away from the base.

In any of the preceding embodiments, the microfluidic valve can further comprise a cover plate connected to the sleeve. In any of the preceding embodiments, the cover plate, on its end surface toward the base, can comprise an annular groove to secure the position of the sleeve and the rotor along the axis of the sleeve.

In any of the preceding embodiments, the cover plate can further comprise an operating through-hole connected with the annular groove. In any of the preceding embodiments, the operating through-hole can expose the rotor to the outside environment of the microfluidic valve.

In any of the preceding embodiments, the microfluidic valve can comprise a plurality of sleeves. In any of the preceding embodiments, the microfluidic valve can comprise a plurality of annular grooves on the cover plate. In any of the preceding embodiments, each sleeve can correspond to an annular groove on the cover plate.

In any of the preceding embodiments, the microfluidic valve can comprise two apertures, e.g., two micropores. In any of the preceding embodiments, the microfluidic valve can comprise a first micro-column, a second micro-column, and a third micro-column. In any of the preceding embodiments, the first micro-column and the third micro column can be disposed on opposite sides of the rotor. In any of the preceding embodiments, the first micro-column and the third micro column can be configured to close or open or capable of closing or opening the two micropores simultaneously. In any of the preceding embodiments, the second micro-column can be configured to close or open or capable of closing or opening one of the two micropores individually while leaving the other micropore open or closed.

In any of the preceding embodiments, the end of the sleeve toward the base and the end of the micro-column toward the base can be at least partially embedded in the base. In any of the preceding embodiments, the base, on its surface toward the micro-column, can comprise an annular groove which is capable of engaging the micro-column. In any of the preceding embodiments, the end of the micro-column toward the base can be configured to slide or capable of sliding within the annular groove. In any of the preceding embodiments, a resilient gasket can be provided between the sleeve and the outside wall of the micro-column.

In any of the preceding embodiments, the aperture, e.g., the micropore, can be provided on the resilient gasket. In any of the preceding embodiments, the micropore can be provided between the connecting end surfaces of the sleeve and the base. In any of the preceding embodiments, the outside wall of the micro-column can be configured to block or close or capable of blocking or closing the micropore.

In any of the preceding embodiments, the aperture, e.g., the micropore, can be provided in the direction along the thickness of the base. In any of the preceding embodiments, the end surfaces of the micro-column away from the rotor can be configured to block or close or capable of blocking or closing the micropore.

In any of the preceding embodiments, the rotor, on the circumference of the end surface toward the base, can comprise a guiding sleeve. In any of the preceding embodiments, the guiding sleeve can rotate with the sleeve. In any of the preceding embodiments, the micro-structure (such as a micro-column) can be provided on the guiding sleeve.

In any of the preceding embodiments, the aperture, e.g., the micropore, can comprise a chamber. In any of the preceding embodiments, the micropore can comprise a microchannel. In any of the preceding embodiments, the microchannel can be configured to communicate with the mixing chamber through the chamber.

In any of the preceding embodiments, the chamber can comprise a first section proximal to the mixing chamber and a second section distal to the mixing chamber.

In any of the preceding embodiments, the ratio of the diameters of the first section and the second section can be between about 1:3 and about 1:10.

In any of the preceding embodiments, the diameter of the aperture, e.g., the micropore, can be larger than about one percent of the diameter of the rotor. In any of the preceding embodiments, the diameter of the aperture, e.g., the micropore, can be smaller than about ½ of the diameter of the rotor.

In another aspect, provided herein is a microfluidic chip, comprising a chip body and one or more of the microfluidic valves according to any of the preceding embodiments.

In one aspect, provided herein is a microfluidic valve, comprising: a base; a sleeve disposed on the base; a rotor disposed within the sleeve, wherein the rotor, the sleeve, and the base form a mixing chamber; an aperture configured to communicate or capable of communicating with the mixing chamber; and a structure disposed on the rotor, wherein the structure is configured to block or close or capable of blocking or closing the communication between the aperture and the mixing chamber. In one embodiment, the aperture is or comprises an aperture, e.g., a micropore. In another embodiment, the base comprises an aperture, e.g., a micropore. In any of the preceding embodiments, the structure on the rotor can be or comprise a micro-column. In one embodiment, the micro-column comprises a feature for facilitating mixing or stirring of a substance inside the mixing chamber.

In any of the preceding embodiments, the rotor, on its end surface distal to the base, can comprise an interface structure for rotating the rotor. In one embodiment, the interface structure comprises a protuberance, a groove, or a combination thereof.

In any of the preceding embodiments, the sleeve, on its end distal to the base, can comprise an inward annular protuberance. In one embodiment, the inward annular protuberance secures the position of the rotor inside the sleeve along the axis of the sleeve.

In any of the preceding embodiments, the end surface of the sleeve distal to the base can be flush with or higher than the end surface of the rotor distal to the base.

In any of the preceding embodiments, the microfluidic valve can further comprise a cover plate fixed to or releasably connected to the sleeve. In one aspect, the cover plate, on its end surface proximal to the base, comprises an annular groove to secure the position of the sleeve and the rotor along the axis of the sleeve. In another aspect, the cover plate further comprises an operating through-hole connected with the annular groove, wherein operating through-hole is configured to expose or capable of exposing the rotor to the outside of the microfluidic valve. In any of the preceding embodiments, the microfluidic valve can comprise a plurality of annular grooves on the cover plate.

In any of the preceding embodiments, the microfluidic valve can comprise a plurality of sleeves. In one embodiment, each of the plurality of sleeves corresponds to an annular groove on the cover plate.

In any of the preceding embodiments, the microfluidic valve can comprise one or more apertures, such as two micropores. In any of the preceding embodiments, the microfluidic valve can comprise one or more structures on the rotor, such as three micro-columns, namely, a first micro-column, a second micro-column, and a third micro-column. In one embodiment, the first micro-column and the third micro column are disposed on opposite sides of the rotor. In one aspect, the first micro-column and the third micro column are configured to close or open or capable of closing or opening two micropores simultaneously. In another aspect, the second micro-column is configured to close or open or capable of closing or opening one of the micropores individually.

In any of the preceding embodiments, the end of the sleeve proximal to the base can be at least partially embedded in the base. In any of the preceding embodiments, the end of the structure on the rotor proximal to the base can be at least partially embedded in the base.

In any of the preceding embodiments, the base, on its surface proximal to the rotor, can comprise an annular groove capable of engaging the structure on the rotor. In any of the preceding embodiments, the end of the structure proximal to the base can be configured to be able to slide within the annular groove.

In any of the preceding embodiments, a resilient gasket can be provided between the sleeve and an outside wall of the structure on the rotor. In one embodiment, the aperture is provided on the resilient gasket. In one other embodiment, the aperture is provided between the connecting end surfaces of the sleeve and the base. In yet another embodiment, the aperture is provided on the resilient gasket and between the connecting end surfaces of the sleeve and the base. In some embodiments, the outside wall of the structure on the rotor is configured to block or close or capable of blocking or closing the aperture.

In any of the preceding embodiments, the aperture can be provided in the direction along the thickness of the base. In one aspect, the structure on the rotor has an end surface proximal to the base, and the end surface is configured to block or close or capable of blocking or closing the aperture.

In any of the preceding embodiments, the rotor, on the circumference of the end surface proximal to the base, can comprise a guiding sleeve. In one aspect, the guiding sleeve is configured to rotate or capable of rotating with the sleeve. In any of the preceding embodiments, the structure on the rotor can be provided on the guiding sleeve.

In any of the preceding embodiments, the aperture can comprise an aperture chamber and a channel. In one aspect, the channel is configured to communicate with the mixing chamber through the aperture chamber. In another aspect, the aperture chamber comprises a first section proximal to the mixing chamber and a second section distal to the mixing chamber. In still another aspect, the ratio of the diameters of the first section and the second section is between about 1:3 and about 1:10.

In any of the preceding embodiments, the diameter of the aperture can be larger than about one percent of the diameter of the rotor. In any of the preceding embodiments, the diameter of the aperture can be smaller than about ½ of the diameter of the rotor. In some embodiments, the diameter of the aperture is larger than about one percent and smaller than about ½ of the diameter of the rotor.

In any of the preceding embodiments, the mixing chamber can comprise substances to be mixed, one or more samples to be analyzed, and/or one or more reagents for a reaction.

In another aspect, provided herein is a microfluidic chip, comprising a chip body, and one or more of the microfluidic valve according to any of the preceding embodiments.

In still another aspect, provided herein is a system, comprising one or more of the microfluidic chip disclosed herein, and optionally a means for detecting a reaction in the microfluidic chip.

In another aspect, provided herein is a kit, comprising one or more of the microfluidic chip disclosed herein, and optionally one or more reagents for performing a reaction in the microfluidic chip, and/or one or more reagents for detecting a reaction in the microfluidic chip.

In yet another aspect, disclosed herein is a method, comprising: 1) turning the rotor to open the aperture of the microfluidic valve according to any of the preceding embodiments; 2) introducing a liquid in the mixing chamber via the aperture; and 3) turning the rotor to stir or agitate the liquid in the mixing chamber, e.g., to mix the substances in the liquid. In one embodiment, the present method further comprises discharging the liquid from the mixing chamber via the aperture. In one embodiment, the liquid is discharged by applying a centrifugal force to the microfluidic valve.

In one aspect, any suitable power source of the rotor 19 may be used, for example, the power can be provided through supporting equipment, as well as a micro electrical machine or a micro motor individually provided on the microfluidic chip.

Figure 6:
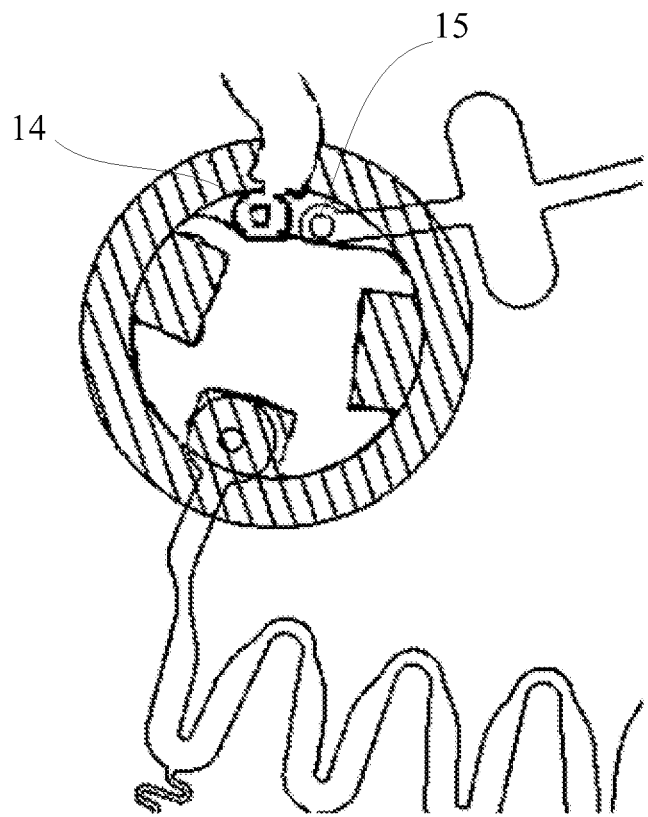
FIG. 6 is a top view of a mixing chamber or cell, in one embodiment of the present disclosure.

In one aspect, as shown in FIG. 6, in the mixing cell, the point connecting the internal circulating system of air circuit and the mixing cell is the mixing cell's exhaust vent 15, and the sample inflow hole of the mixing cell is its liquid inlet hole 14. In one aspect, the distance between the liquid inlet hole 14 and the rotation center is larger than that between the exhaust vent 15 and the rotation center. In one aspect, as shown in FIG. 6, this can ensure samples will not enter the exhaust vent after filling the mixing cell. Thus, on the one hand, the volume of the mixing cell will be fully utilized, and on the other hand, smooth gas flow in the internal circulating system of air circuit will be effectively ensured.

Figure 7:
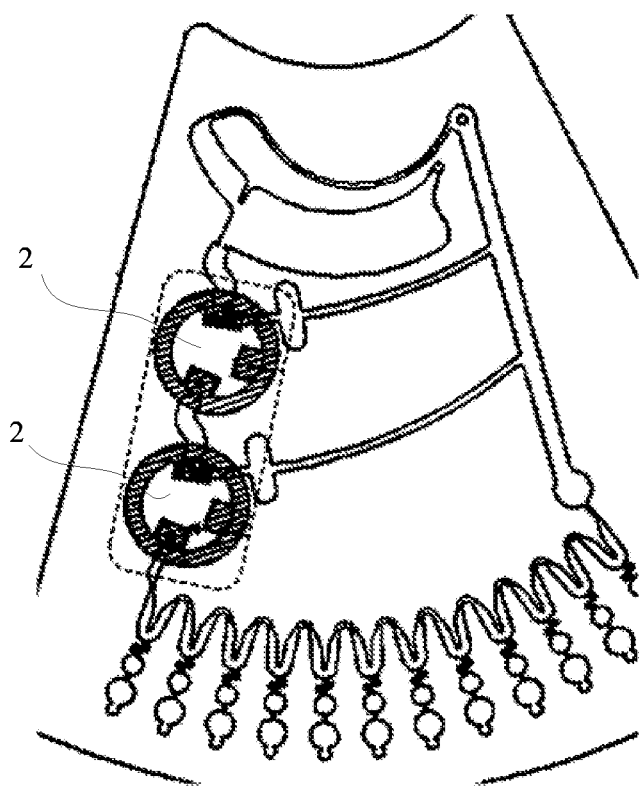
FIG. 7 is a structural diagram of an integrated microfluidic chip comprising a plurality of serially connected mixing chambers or cells, in one embodiment of the present disclosure.
Figure 8:
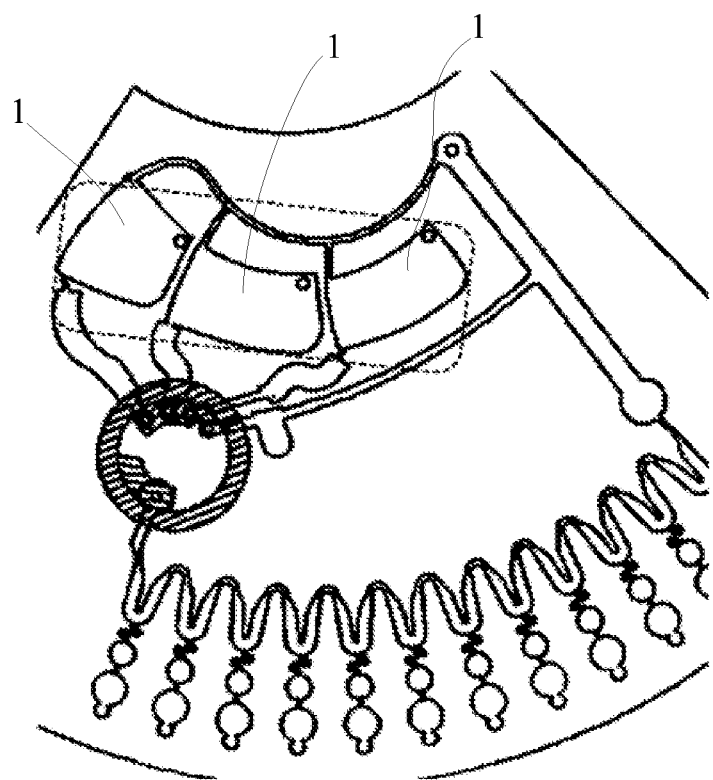
FIG. 8 is a structural diagram of an integrated microfluidic chip comprising a plurality of sample chambers or cells arranged in parallel, in one embodiment of the present disclosure.

In one aspect, different samples may be delivered and/or assayed using the presently disclosed microfluidic chip at the same time. For example, each different sample can be injected into a different sample cell on a microfluidic chip, and the plurality of sample cells can be connected in parallel, for example, all of which are connected with the mixing cell. As shown in FIG. 8, through such structure, several samples can be treated on a microfluidic chip, or different samples can be mixed with the reagent evenly and successively through controlling the connection sequence of different sample cells and the mixing cell; or several mixing cells can be connected in series (e.g., as shown in FIG. 7) such that a sample can be mixed evenly and reacted with different reagents successively, in any suitable order, because different reagents may be provided in each successively connected mixing cells.

In one aspect, one or more reagents for a reaction can be provided, for example, pre-embedded, in the sample cell 1, the mixing cell 2, and the reaction cell 3, which may be a single one or a mixture of several substances. In one aspect, the pre-provided reagents can be liquid, solid, powdery, granular, film-shape or gelatinous, etc. As for the method of provision, liquid or solid substances can be added directly; or the liquid substances can be dried and solidified through natural drying, oven drying, air drying, or freeze drying after being added.

In particular embodiments, the substrate 16 material of the microfluidic chip can be one of or the mixture of some of glass, silicon, metal, or polymer. The polymer can be one or more of PDMS (polydimethylsiloxane), PMMA (polymethyl methacrylate), PC engineering plastics, COC (copolymers of cycloolefin), PET (Polyethylene terephthalate), Japan Zeon's COP (Cyclo-olefin polymer), and ABS (Acrylonitrile butadiene Styrene copolymers), and any suitable combination thereof. In particular embodiments, the encapsulation or bonding method of the substrate of the microfluidic chip and its assorted cover plate can be chosen from hot pressing, gluing, laser welder, ultrasonic welding, thread screwing, or any combination thereof.

In some embodiments, the microfluidic chip disclosed herein is integrated, simply, and effective, to complete a series of complex reactions in biological, chemical and immunological and other fields, and to complete the sample treatment and even the whole detection process automatically in one chip.

In another aspect, provided herein is a method of using the presently disclosed microfluidic chip, the method comprising:

1) adding a sample to the sample cell of the microfluidic chip through the sample inlet;

2) sealing the sample inlet and/or the exhaust port;

3) optionally mixing and reacting the sample with one or more reagents in the sample cell, for example pre-embedded reagent or reagents, and e.g., with the help of a supporting equipment, wherein the chip can be rotated based on the need, and/or the temperature of the sample inside the sample chamber can be controlled;

4) centrifuging the chip at a first speed (e.g., a low speed) and transferring the liquid from step 2) or 3) to the mixing cell, and optionally with the help of the supporting equipment, allowing the liquid to mix and react with one or more reagents in the mixing cell, for example pre-embedded reagent or reagents, during which the chip can be rotated or the temperature inside the sample cell and/or in the mixing cell can be controlled as needed;

5) centrifuging the chip at a second speed (e.g., a moderate speed or a higher speed than the first speed) and transferring the mixed liquid of step 4) to the distribution channel;

6) centrifuging the chip at a third speed (e.g., a high speed or a higher speed than the second speed) and transferring the liquid in the distribution channel to each reaction cell;

7) allowing the liquid to react with one or more reagents in the reaction cell, optionally with the help of the supporting equipment; and 8) testing and/or analyzing the reaction result(s).

In specific embodiments, the first speed at which the microfluidic chip was centrifuged is between about 100 rpm and about 700 rpm, for example, about 100 rpm, about 150 rpm, about 200 rpm, about 250 rpm, about 300 rpm, about 350 rpm, about 400 rpm, about 450 rpm, about 500 rpm, about 550 rpm, about 600 rpm, about 650 rpm, or about 700 rpm. In one embodiment, the first speed is about 600 rpm, which is a low speed for transferring a reagent and/or sample in the sample cell to the mixing cell.

In specific embodiments, the second speed at which the microfluidic chip was centrifuged is between about 700 rpm and about 2000 rpm, for example, about 700 rpm, about 800 rpm, about 900 rpm, about 1000 rpm, about 1100 rpm, about 1200 rpm, about 1300 rpm, about 1400 rpm, about 1500 rpm, about 1600 rpm, about 1700 rpm, about 1800 rpm, about 1900 rpm, or about 2000 rpm. In one embodiment, the second speed is about 800 rpm, which is a moderate speed for transferring a reagent and/or sample in the mixing cell to the distribution channel.

In specific embodiments, the third speed at which the microfluidic chip was centrifuged is between about 2000 rpm and about 8000 rpm, for example, about 2000 rpm, about 2500 rpm, about 3000 rpm, about 3500 rpm, about 4000 rpm, about 4500 rpm, about 5000 rpm, about 5500 rpm, about 6000 rpm, about 6500 rpm, about 7000 rpm, about 7500 rpm, or about 8000 rpm. In one embodiment, the third speed is about 4000 rpm, which is a high speed for transferring a reagent and/or sample in the distribution channel to the reaction chamber.

In particular embodiments, the integrated microfluidic chip disclosed herein is simple in its structural feature and supporting equipment. Specifically, it uses a centrifugal force to drive the liquid in the microfluidic chip to flow. In one aspect, it uses a choke plug on the rotor in the mixing cell to control the fluid or gas flow among different chambers in the chip. In one aspect, it uses mutually connected internal circulating systems of air circuit to achieve uniform control of the air pressure balance needed by different areas such as the sample treatment zone, mixing zone and reaction zone, avoiding the pollution problem in the reaction cell and solving the sealing problem of the integration of mixing cell and microfluidic chip. In one other aspect, it uses a sedimentation tank to collect the solid contents in the solution in the reaction cell, effectively avoiding the purification of reaction products. In one aspect, it uses the special liquid blocking structure provided at the specific position of the buffer zone connected with the sample cell, and the connecting pipes and air circuit internal circulating pipes among sample cells, mixing cells, distribution pools and reaction cells to effectively buffer the overflowing caused by thermal expansion of liquid or in the transferring process of liquid among different reaction cells. In one aspect, the fully integrated chip and the full automatic processing of its supporting equipment disclosed herein can greatly simplify the operator's work and improve the work efficiency, and provide an effective platform for such various forms of reactions as nucleic acid amplification reaction, biochemical reaction and immunoreaction, which can be widely applied in fields that need a biological reaction such as clinical diagnosis, food safety and environmental monitoring.

In one aspect, the distributing channel herein and its arrangement on a microfluidic chip is one disclosed in U.S. patent application Ser. No. 15/123,978, filed Sep. 6, 2016 and published as US 2017/0014818 A1, entitled "Multi-index detection microfluidic chip and methods of use," the content of which is incorporated herein by reference in its entirety for all purposes. In one embodiment, the microfluidic chip adopts centrifugation for uniformly distributing samples into reaction chambers, in which one or more targets are detected and/or assayed. In one aspect, the present disclosure achieves uniform distribution of the samples by using a suitable ratio of cross-sectional areas of the distribution channel. In one aspect, the ratio of cross-sectional areas of the distribution channel can be adjusted to achieve optimal uniform distribution of the samples into the reaction chambers. In another aspect, the present disclosure ensures that the reaction chambers are fully filled with a sample after centrifugal distribution, through the design of buffering chambers. In one aspect, the present disclosure ensures that the reaction chambers sustain a fully-filled state during the entire reaction period, and in specific embodiments, reduces or prevents the reaction product of each reaction chamber to spread to the distribution channel and adjacent reaction chambers.

In some aspects, the body structure of an exemplary microfluidic devices typically employs a solid or semi-solid substrate that may be planar in structure, e.g., substantially flat or having at least one flat surface. Suitable substrates may be fabricated from any one of a variety of materials, or combinations of materials. Often, the planar substrates are manufactured using solid substrates common in the fields of microfabrication, e.g., silica-based substrates, such as glass, quartz, silicon or polysilicon, as well as other known substrates, e.g., gallium arsenide. In the case of these substrates, common microfabrication techniques, such as photolithographic techniques, wet chemical etching, micromachining, e.g., drilling, milling and the like, may be readily applied in the fabrication of microfluidic devices and substrates. Alternatively, polymeric substrate materials may be used to fabricate the devices of the present invention, including, e.g., polydimethylsiloxanes (PDMS), polymethylmethacrylate (PMMA), polyurethane, polyvinylchloride (PVC), polystyrene, polysulfone, polycarbonate and the like. In the case of such polymeric materials, injection molding or embossing methods may be used to form the substrates having the channel and reservoir geometries as described herein. In such cases, original molds may be fabricated using any of the above described materials and methods.

The channels and chambers of an exemplary device are typically fabricated into one surface of a planar substrate, as grooves, wells or depressions in that surface. A second planar substrate, typically prepared from the same or similar material, is overlaid and bound to the first, thereby defining and sealing the channels and/or chambers of the device. Together, the upper surface of the first substrate and the lower mated surface of the upper substrate define the interior portion of the device, i.e., defining the channels and chambers of the device. In some embodiments, the upper layer may be reversibly bound to the lower layer.

Exemplary systems may also include sample sources that are external to the body of the device per se, but still in fluid communication with the sample loading channel. In some embodiments, the system may further comprise an inlet and/or an outlet to the micro-channel. In some embodiments, the system may further comprise a delivering means to introduce a sample to the micro-channel. In some embodiments, the system may further comprise an injecting means to introduce a liquid into the micro-channel Any liquid manipulating equipment, such as pipettes, pumps, etc., may be used as an injecting means to introduce a liquid to the micro-channel.

In some embodiments, the wave-shaped distribution channel comprises at least 1, 2, 3, 4, 5, 6, 7, 8, 9, or 10 valleys. In some embodiments, the wave-shaped distribution channel comprises at least about 10, about 20, about 40, about 60, about 80, about 100, about 120, about 140, about 160, about 180, or about 200 valleys. In some embodiments, the wave-shaped distribution channel comprises at least 1, 2, 3, 4, 5, 6, 7, 8, 9, or 10 peaks. In some embodiments, the wave-shaped distribution channel comprises at least about 10, about 20, about 40, about 60, about 80, about 100, about 120, about 140, about 160, about 180, or about 200 peaks. In some embodiments, the wave-shaped distribution channel comprises at least 1, 2, 3, 4, 5, 6, 7, 8, 9, or 10 valley/peak pairs (one peak and one valley adjacent and connected to each other). In some embodiments, the wave-shaped distribution channel comprises at least about 10, about 20, about 40, about 60, about 80, about 100, about 120, about 140, about 160, about 180, or about 200 valley/peak pairs. In any of the preceding embodiments, each of the valleys of the distribution channel can be connected to at least one reaction chamber via a linking channel on the bottom plate.

In one aspect, the linking channel comprises at least one buffering chamber, and the buffering chamber is located on the linking channel, between the reaction chamber and the distribution channel. In one aspect, the volume of the buffering chamber is between about 0.2 and about 0.8 times of the volume of the reaction chamber that it is connected to. In some aspects, the ratio between the volume of said buffering chamber and the volume of said reaction chamber is less than about 0.2, between about 0.2 and about 0.3, between about 0.3 and about 0.4, between about 0.4 and about 0.5, between about 0.5 and about 0.6, between about 0.6 and about 0.7, between about 0.7 and about 0.8, or more than about 0.8.

In another aspect, the junction between the linking channel and the reaction chamber is located in a line connecting the center of the microfluidic chip and the reaction chamber.

In one embodiment, in the bottom plate, the distribution channels are distributed in one or more circles. In another aspect, one or more distribution channels are formed by one or more circles.

In some embodiments, the volume of the reaction chamber is between about 0.1 µL and about 5.0 µL.

In particular embodiments, at least one or all of the reaction chambers of microfluidic chip are pre-loaded with a reagent that is capable of specific interaction and/or reaction with one or more components of the sample. In one aspect, the reagent comprises a nucleic acid, for example, a polynucleotide that is capable of specific hybridization with one or more target nucleic acids in the sample.

In some embodiments, the ratio between the volume of any V-shaped portion (the V-shaped portion comprising the valley) of the distribution channel and the volume of the reaction chamber connected to the valley is between about 1.2 and about 1.8, and in particular embodiments, the ratio is less than about 1.2, between about 1.2 and about 1.3, between about 1.3 and about 1.4, between about 1.4 and about 1.5, between about 1.5 and about 1.6, between about 1.6 and about 1.7, between about 1.7 and about 1.8, or more than about 1.8.

In some embodiments, the ratio between the narrowest and the widest cross sectional areas in the distribution channel is between about 0.2 and about 1, and in particular embodiments, the ratio is less than about 0.2, between about 0.2 and about 0.3, between about 0.3 and about 0.4, between about 0.4 and about 0.5, between about 0.5 and about 0.6, between about 0.6 and about 0.7, between about 0.7 and about 0.8, between about 0.8 and about 0.9, or between about 0.9 and about 1.0. In one aspect, where the ratio between the narrowest and the widest cross sectional areas in the distribution channel is less than about 1.0, the cross sectional area of the peak is smaller than that of the valley.

In any of the preceding embodiments, the microfluidic chip can comprise between about 5 and about 100 reaction chambers. In some embodiments, the microfluidic chip comprises at least 1, 2, 3, 4, 5, 6, 7, 8, 9, or 10 reaction chambers. In some embodiments, the microfluidic chip comprises at least about 10, about 20, about 40, about 60, about 80, about 100, about 120, about 140, about 160, about 180, or about 200 reaction chambers. The reaction chambers on the microfluidic chip can be divided into one or more groups. For example, reaction chambers connected to the same distribution channel can be grouped together, and the microfluidic chip can comprise more than one distribution channels and each distribution channel is connected to a distinct group of reaction chambers. In one aspect, reaction chambers of different groups are not connected.

In any of the preceding embodiments, a double faced adhesive tape can be used to bond the bottom plate and the cover plate firmly. In one aspect, the double faced adhesive tape has the desired adhesive strength and resistance to conventional heating temperatures, and has no significant adverse effects on the specificity of the reactions in the chip.

In general, polymer microfluidic chip can be manufactured using heat pressing and/or laser welding to bond the bottom plate and the cover plate by heating and melting their surfaces. Heat pressing and laser welding, however, are relatively expensive. In the case of pre-loaded sample in the bottom of the chip, the process of laser welding and heat pressing can have a negative impact on biological activity and/or chemical property of the pre-loaded sample. In addition, these two processing methods may have an impact on the shape of the microfluidic channel, and can even cause channel blockage or chip leakage.

In the present disclosure, in one aspect, the double faced adhesive tapes have sufficient adhesive strength and capacity to withstand various heating conditions in biological assays. In one aspect, the double faced adhesive tapes prevent chip leakage in various heating conditions and thus prevent test failure or environmental contamination due to chip leakage.

In the present disclosure, in one aspect, the double faced adhesive tapes have appropriate biocompatibility, and can maintain the biological activities and chemical properties of the test samples, including embedded samples. In another aspect, the double faced adhesive tapes do not significantly or adversely affect the reaction in the chip, including the specificity of the reaction in the chip.

In the present disclosure, in one aspect, the double faced adhesive tapes have optical properties that are compatible with the detection means in the present disclosure. For example, when fluorescence detection are used to detect fluorescence that passes through, the double faced adhesive tape has sufficient optical transmittance for fluorescent light emitted from the reaction chambers. In another aspect, when fluorescence is to be detected by reflection, the fluorescence background of the double faced adhesive tape is low enough at the detection wavelengths to allow sensitive detection of fluorescent light emitted from the reaction chambers.

In one aspect, the chip of the disclosure uses a viscous sealing membrane to seal. In other aspects, the chip can be sealed using mineral oil or silicone oil through secondary loading in order to seal the initially loaded samples in the chip. Compared to using mineral oil or silicone oil, using a viscous sealing membrane to seal the chip avoids secondary loading and reduces the burden on the operator.

In one aspect, using a microfluidic chip of the present disclosure, the operator can pre-load different substances in different reaction chambers, for example, during chip production. Thus, the present disclosure enables various forms of detection on the same chip (or on chips of the same design), including nucleic acid amplification reactions, biochemical reactions (e.g., enzyme catalyzed reactions), and immune reactions. In another aspect, the present disclosure enables the detection of different substance in the same reaction or reactions, such that multiple applications on the same chip platform can be performed. For example, to detect a particular nucleic acid fragment in the sample by a nucleic acid amplification reaction on the chip (such as a mutant gene or genes of pathogenic microorganisms), the primer(s) and auxiliary components necessary for specific biochemical reactions with different nucleic acid fragments in the test sample can be pre-loaded in different reaction chambers. In another example, to detect a specific substance or component in the sample by biochemical reaction on the chip (such as glucose or triglycerides), reagents necessary for specific biochemical reactions with the target substance or component in the test sample can be pre-loaded in different reaction chambers. In yet another example, to detect a specific component in the sample by immune reaction on the chip (such as a specific antigen or antibody), reagents necessary for specific immune reactions with the target substance or component can be pre-loaded in the test sample in different reaction chambers.

In any of the preceding embodiments, the microfluidic chip can be used for real-time detection during the reaction or detected after the reaction, for example, by fluorescence, turbidity, color, detection equipment, or direct observation by the naked eyes.

Typically, when the sample is distributed to the reaction chambers through centrifugation, a liquid film of the sample remains on the inner surface of the linking channel. If two adjacent reaction chambers are connected by a linking channel and are separated only by the linking channel, then the reaction product of each reaction chamber is likely to diffuse into the adjacent chamber through the liquid film and lead to cross-contamination.

In one aspect, the present disclosure designs a buffering chamber in the linking channel to avoid the cross-contamination. Typically, the reagents, target molecules, and reaction products diffuse from higher concentration to lower concentration. For example, when the reaction products (e.g., amplified products from a nucleic acid amplification reaction) diffuse from the reaction chambers, they will diffuse into the buffering chamber first, which reduces the concentration of the diffused products dramatically. As such, the reaction products in the buffering chambers are less likely to further diffuse out into the linking channels, into the distribution channel, and/or into adjacent reaction chambers. Accordingly, the present disclosure reduces the chance of diffused products to spread to the linking channel and therefore improves the accuracy of test results.

In one aspect, the present disclosure is directed to an article of manufacture, which article of manufacture comprises: a) a packaging material; b) a microfluidic chip disclosed herein; optionally, c) a label indicating that the article is for an assay, for example, for assaying an analyte; and optionally, d) an instruction, for example, for using the article of manufacture for an assay.

The disclosure comprises kits comprising a microfluidic chip or an assay device disclosed herein. For example, kits for diagnosing or aiding in the diagnosis of a condition or a disease (e.g., cancer) or for monitoring a condition or a disease are included. In one embodiment, the kit comprises one or more reagents for detecting one or more analytes, for example, biomarkers associated with a condition or a disease. The reagents comprise labeled compounds or agents capable of detecting a polypeptide or an mRNA encoding a polypeptide corresponding to a biomarker in a biological sample, and means for determining the absence, presence, and/or amount of the polypeptide or mRNA in the sample (e.g., an antibody which binds the polypeptide or an oligonucleotide probe which binds to DNA or mRNA encoding the polypeptide). Suitable reagents for binding with a polypeptide corresponding to a biomarker include antibodies, antibody derivatives, antibody fragments, and the like. Suitable reagents for binding with a nucleic acid (e.g., a genomic DNA, an mRNA, a spliced mRNA, a cDNA, or the like) include complementary nucleic acids. In one embodiment, the kit comprises a reference sample. In one aspect, the reference sample is used to compare the results obtained from the sample being tested. The kit can also comprise other components such as a buffering agent, a preservative, or a protein stabilizing agent. The kit can further comprise components necessary for detecting a detectable label (e.g., an enzyme or a substrate).

Each component of the kit can be enclosed within an individual container and all of the various containers can be within a single package, along with instructions for interpreting the results of the assays performed using the kit.

In one aspect, the article of manufacture or kit disclosed herein is used for diagnosing a condition or a disease in a subject, assessing the risk of a subject developing a condition or a disease, and/or evaluating prognosis of a condition or a disease in a subject, for example, following treatment of the subject with a therapy. In one aspect, the article of manufacture is used to assay a sample obtained from a subject having or suspected of having a condition or a disease.

C. Use of the Microfluidic Chip

The present microfluidic chip can be used in any suitable assay to improve assay precision, reproducibility, and/or sensitivity, particularly for the assays involving small reaction volumes. For instance, the microfluidic chip can be used in assaying the interaction between various moieties, e.g., nucleic acids, immunoreactions involving proteins, interactions between a protein and a nucleic acid, a ligand-receptor interaction, and small molecule and protein or nucleic acid interactions, etc.

The present microfluidic chip can be used to assay any analyte, e.g., a cell, a cellular organelle, a virus, a molecule and an aggregate or complex thereof. Exemplary cells include animal cells, plant cells, fungus cells, bacterium cells, recombinant cells and cultured cells. Animal, plant, fungus, bacterium cells can be derived from any genus or subgenus of the Animalia, Plantae, fungus or bacterium kingdom. Cells derived from any genus or subgenus of ciliates, cellular slime molds, flagellates and microsporidia can also be assayed by the present methods. Cells derived from birds such as chickens, vertebrates such as fish and mammals such as mice, rats, rabbits, cats, dogs, pigs, cows, ox, sheep, goats, horses, monkeys and other non-human primates, and humans can be assayed by the present methods.

For animal cells, cells derived from a particular tissue or organ can be assayed. For example, connective, epithelium, muscle or nerve tissue cells can be assayed. Similarly, cells derived from an internal animal organ such as brain, lung, liver, spleen, bone marrow, thymus, heart, lymph, blood, bone, cartilage, pancreas, kidney, gall bladder, stomach, intestine, testis, ovary, uterus, rectum, nervous system, gland, internal blood vessels, etc. can be assayed. Further, cells derived from any plants, fungi such as yeasts, bacteria such as eubacteria or archaebacteria can be assayed. Recombinant cells derived from any eukaryotic or prokaryotic sources such as animal, plant, fungus or bacterium cells can also be assayed. Body fluid such as blood, urine, saliva, bone marrow, sperm or other ascitic fluids, and any subfraction thereof, e.g., serum or plasma, can also be assayed.

Exemplary cellular organelles include nuclei, mitochondria, chloroplasts, ribosomes, ERs, Golgi apparatuses, lysosomes, proteasomes, secretory vesicles, vacuoles and microsomes. Exemplary molecules include inorganic molecules, organic molecules and a complex thereof. Exemplary organic molecules include amino acids, peptides, proteins, nucleosides, nucleotides, oligonucleotides, nucleic acids, vitamins, monosaccharides, oligosaccharides, carbohydrates, lipids and a complex thereof.

Any amino acids can be assayed by the present microfluidic chip. For example, a D- and a L-amino-acid can be assayed. Any proteins or peptides can be assayed by the present microfluidic chip. For example, enzymes, transport proteins such as ion channels and pumps, nutrient or storage proteins, contractile or motile proteins such as actins and myosins, structural proteins, defense protein or regulatory proteins such as antibodies, hormones and growth factors can be assayed. Proteineous or peptidic antigens can also be assayed.

Any nucleosides can be assayed by the present microfluidic chip. Examples of such nucleosides include adenosine, guanosine, cytidine, thymidine and uridine. Any nucleotides can be assayed according to the present disclosure. Examples of such nucleotides include AMP, GMP, CMP, UMP, ADP, GDP, CDP, UDP, ATP, GTP, CTP, UTP, dAMP, dGMP, dCMP, dTMP, dADP, dGDP, dCDP, dTDP, dATP, dGTP, dCTP and dTTP. Any nucleic acids, including single-, double and triple-stranded nucleic acids, can be assayed by the present microfluidic chip. Examples of such nucleic acids include DNA, such as A-, B- or Z-form DNA, and RNA such as mRNA, miRNA, piRNA, tRNA and rRNA.

Any vitamins can be assayed by the present microfluidic chip. For example, water-soluble vitamins such as thiamine, riboflavin, nicotinic acid, pantothenic acid, pyridoxine, biotin, folate, vitamin B12 and ascorbic acid can be assayed. Similarly, fat-soluble vitamins such as vitamin A, vitamin D, vitamin E, and vitamin K can be assayed.

Any monosaccharides, whether D- or L-monosaccharides and whether aldoses or ketoses, can be assayed the present microfluidic chip. Examples of monosaccharides include triose such as glyceraldehyde, tetroses such as erythrose and threose, pentoses such as ribose, arabinose, xylose, lyxose and ribulose, hexoses such as allose, altrose, glucose, mannose, gulose, idose, galactose, talose and fructose and heptose such as sedoheptulose.

Any lipids can be assayed by the present microfluidic chip. Examples of lipids include triacylglycerols such as tristearin, tripalmitin and triolein, waxes, phosphoglycerides such as phosphatidylethanolamine, phosphatidylcholine, phosphatidylserine, phosphatidylinositol and cardiolipin, sphingolipids such as sphingomyelin, cerebrosides and gangliosides, sterols such as cholesterol and stigmasterol and sterol fatty acid esters. The fatty acids can be saturated fatty acids such as lauric acid, myristic acid, palmitic acid, stearic acid, arachidic acid and lignoceric acid, or can be unsaturated fatty acids such as palmitoleic acid, oleic acid, linoleic acid, linolenic acid and arachidonic acid.

The present microfluidic chip can be used to assay any sample. For example, the present method can be used to assay a mammalian sample. Exemplary mammals include bovines, goats, sheep, equines, rabbits, guinea pigs, murine, humans, felines, monkeys, dogs and porcines. The present microfluidic chip can also be used to assay a clinical sample. Exemplary clinical samples include serum, plasma, whole blood, sputum, cerebral spinal fluid, amniotic fluid, urine, gastrointestinal contents, hair, saliva, sweat, gum scrapings and tissue from biopsies. Preferably, the present microfluidic chip is used to assay a human clinical sample.

Any suitable reagents can be used in an assay according to the present disclosure. In one aspect, the reagents used in the present disclosure bind or interact specifically with an analyte in a sample. Exemplary reagents include cells, cellular organelles, viruses, molecules and an aggregate or complex thereof. In one aspect, the reagent is an antibody, or a nucleic acid.

The present microfluidic chip can be used in any suitable assay format, for example, in a direct assay format, a sandwich assay format or a competition assay format. In one embodiment, a different plurality of reagents are used to assay a single analyte. In another embodiment, a different plurality of reagents are used to assay a different plurality of analytes. In still another embodiment, a plurality of reagents are attached to the inner surface of the reaction chamber, and is used, for example, to assay one or more analytes in one or more samples.

The present microfluidic chip can be used to detect any interaction(s) among moieties selected from the group consisting of a cell, a cellular organelle, a virus, a molecule and an aggregate or complex thereof. For example, interactions between or among macromolecules, such as DNA-DNA, DNA-RNA, RNA-RNA, DNA-protein, RNA-protein and protein-protein, etc., interactions can be analyzed. In other embodiments, macromolecule-small molecule or small molecule-small molecule interactions are detected or analyze using the present microfluidic chip. More complex interactions including interactions among more than two moieties can also be detected and/or analyzed according to the present disclosure. When DNA-DNA, DNA-RNA, RNA-RNA interactions are to be detected, the contacting, i.e., hybridizing, step, can be conducted under suitable condition, e.g., under low, middle or high stringency, after samples or reagents are delivered to the reaction volumes according to the present disclosure.

The interaction between a test moiety and a plurality of target moieties can be detected by any suitable methods, and the present microfluidic chip can be made to suit the particular detection method. For example, the test moiety and/or target moieties can be labeled to facilitate detection. Any suitable label can be used. Exemplary labels include a radioactive, a fluorescent, a chemical, an enzymatic, a luminescent and a FRET (fluorescence resonance energy transfer) label. The luminescent label can be a chemiluminescent label or a bioluminescent label. The labels can be attached or conjugated, directly or indirectly, to the test moiety alone, the target moiety alone, or on both. The read-out can be a positive or a negative signal. Any suitable assay formats, including sandwich or competitive formats, can be used. Any of the samples or reagents, including the labels, primers or dNTPs of a PCR reaction, or an enzyme, can be delivered using the present microfluidic chip.

In one embodiment, the present microfluidic chip is used to detect interaction between or among a test moiety and a plurality of genes, gene fragments or their encoded products. For instance, the plurality of target genes, gene fragments or their encoded products are involved in a biological pathway, belong to a group of proteins with identical or similar biological function, expressed in a stage of cell cycle, expressed in a cell type, expressed in a tissue type, expressed in an organ type, expressed in a developmental stage, proteins whose expression and/or activity is altered in a disease or disorder type or stage, or proteins whose expression and/or activity is altered by drug or other treatments.

The present microfluidic chip can be used in detecting interaction between or among a single test moiety or substance and a plurality of target moieties. Preferably, the present methods are used in high-throughput mode, e.g., in detecting a plurality of target moieties, and/or interaction between or among a plurality of test moieties or substances. The interaction between a plurality of test moieties or substances and a plurality of target moieties can be detected simultaneously or sequentially.

Microfluidic chips of the present the present disclosure can be used in a variety of applications and reactions, including but not limited to, nucleic acid amplification reactions, biochemical reactions, immune reactions, and for example, isothermal amplification reaction.

Thus, the present microfluidic chips and methods can be used to detect a number of infectious diseases or infection states in a subject. Pathogenic viruses include, but are not limited to, Retroviridae (e.g., human immunodeficiency viruses, such as HIV-1 (also referred to as HTLV-III, LAV or HTLV-III/LAV, or HIV-III); and other isolates, such as HIV-LP; Picornaviridae (e.g., polio viruses, hepatitis A virus; enteroviruses, human coxsackie viruses, rhinoviruses, echoviruses); Calciviridae (e.g., strains that cause gastroenteritis); Togaviridae (e.g., equine encephalitis viruses, rubella viruses); Flaviridae (e.g., dengue viruses, encephalitis viruses, yellow fever viruses); Coronaviridae (e.g., coronaviruses); Rhabdoviridae (e.g., vesicular stomatitis viruses, rabies viruses); Filoviridae (e.g., ebola viruses); Paramyxoviridae (e.g., parainfluenza viruses, mumps virus, measles virus, respiratory syncytial virus); Orthomyxoviridae (e.g., influenza viruses); Bungaviridae (e.g., Hantaan viruses, bunga viruses, phleboviruses and Nairo viruses); Arena viridae (hemorrhagic fever viruses); Reoviridae (e.g., reoviruses, orbiviurses and rotaviruses); Bimaviridae; Hepadnaviridae (Hepatitis B virus); Parvoviridae (parvoviruses); Papovaviridae (papilloma viruses, polyoma viruses); Adenoviridae (most adenoviruses); Herpesviridae (herpes simplex virus (HSV) 1 and 2, varicella zoster virus, cytomegalovirus (CMV), herpes viruses); Poxyiridae (variola viruses, vaccinia viruses, pox viruses); and Iridoviridae (e.g., African swine fever virus); Hepatitis C virus; and unclassified viruses (e.g., the agent of delta hepatitis (thought to be a defective satellite of hepatitis B virus); Norwalk and related viruses, and astroviruses).

Pathogenic bacteria include, but are not limited to, Helicobacterpyloris, Borelia burgdorferi, *Legionella pneumophila, Mycobacteria* sps (e.g. *M. tuberculosis, M. avium, M. intracellulare, M. kansaii, M. gordonae), Staphylococcus aureus, Neisseria gonorrhoeae, Neisseria meningitidis, Listeria monocytogenes, Streptococcus pyrogenes* (Group A *Streptococcus*), *Streptococcus agalactiae* (Group B *Streptococcus*), *Streptococcus* (viridans group), *Streptococcus faecalis, Streptococcus bovis, Streptococcus* (anaerobic sps.), *Streptococcus pneumoniae*, pathogenic *Campylobacter* sp., *Enterococcus* sp., *Haemophilus influenzae, Bacillus anthracis, Corynebacterium diphtheriae, Corynebacterium* sp., *Erysipelothrix rhusiopathiae, Clostridium perfringens, Clostridium tetani, Enterobacter aerogenes, Klebsiella pneumoniae, Pasturella multocida, Bacteroides* sp., *Fusobacterium nucleatum*, pathogenic strains of *Escherichia coli, Streptobacillus moniliformis, Treponema pallidium, Treponema pertenue, Leptospira,* and *Actinomyces israelli.*

Infectious fungi include, but are not limited to, *Cryptococcus neoformans, Histoplasma capsulatum, Coccidioides immitis, Blastomyces dermatitidis, Chlamydia trachomatis, Candida albicans.*

Infectious protozoa include, but are not limited to, *Plasmodium* spp., e.g., *Plasmodium falciparum*; Trypanosomes, e.g., *Trypanosoma cruzi*; and *Toxoplasma gondii.*

It is to be understood that the present microfluidic chips are suitable for detection of the above infectious agents by detecting their genetic material, for example, by PCR of specific nucleic acid sequences that are indicative of the infectious agents, by detecting proteins, lipids, or polysaccharides that are indicative of the infectious agents, and/or by detecting host responses to the infectious agents (e.g., host antibodies to the infectious agents).

Allergens include, but are not limited to, pollens, insect venoms, animal dander dust, fungal spores and drugs (e.g. penicillin) Examples of natural, animal and plant allergens include proteins specific to the following genera: *Canine* (*Canis familiaris*); *Dermatophagoides* (e.g. *Dermatophagoides farinae*); *Felis* (*Felis domesticus*); *Ambrosia* (*Ambrosia artemiisfolia; Lolium* (e.g. *Lolium perenne* or *Lolium multiflorum*); *Cryptomeria* (*Cryptomeria japonica*); *Alternaria* (*Alternaria alternata*); *Alder; Alnus* (*Alnus gultinosa*); *Betula* (*Betula verrucosa*); *Quercus* (*Quercus alba*); *Olea* (*Olea europa*); *Artemisia* (*Artemisia vulgaris*); *Plantago* (e.g. *Plantago lanceolata*); *Parietaria* (e.g. *Parietaria officinalis* or *Parietaria judaica*); *Blattella* (e.g. *Blattella germanica*); *Apis* (e.g. *Apis multiflorum*); *Cupressus* (e.g. *Cupressus sempervirens, Cupressus arizonica* and *Cupressus macrocarpa*); *Juniperus* (e.g. *Juniperus sabinoides, Juniperus virginiana, Juniperus communis* and *Juniperus ashei*); *Thuya* (e.g. *Thuya orientalis*); *Chamaecyparis* (e.g. *Charnaecyparis obtusa*); *Periplaneta* (e.g. *Periplaneta americana*); *Agropyron* (e.g. *Agropyron repens*); *Secale* (e.g. *Secale cereale*); *Triticum* (e.g. *Triticum aestivum*); *Dactylis* (e.g. *Dactylis glomerata*); *Festuca* (e.g. *Festuca elation*); *Poa* (e.g. *Poa pratensis* or *Poa compressa*); *Avena* (e.g. *Avena sativa*); *Holcus* (e.g. *Holcus lanatus*); *Anthoxanthum* (e.g. *Anthoxanthum odoratum*); *Arrhenatherum* (e.g. *Arrhenatherum elatius*); *Agrostis* (e.g. *Agrostis alba*); *Phleum* (e.g. *Phleum pratense*); *Phalaris* (e.g. *Phalaris arundinacea*); *Paspalum* (e.g. *Paspalum notatum*); *Sorghum* (e.g. *Sorghum halepensis*); and *Bromus* (e.g. *Bromus inermis*). Use of epitopes from the above allergens in the present methods for antibody detection and analysis is also envisaged. Using this method, host responses to the allergens such as antibodies generated in the host's bodily fluid can be assayed. The presently disclosed microfluidic chips are particularly suitable for highly sensitive, multiplexed detection of the host antibodies.

The following embodiments are intended to further describe and illustrate various aspects of the present disclosure, but not to limit, the scope of the present disclosure in any manner, shape, or form, either explicitly or implicitly.

Embodiment 1

An integrated microfluidic chip, wherein at least one integrated reaction unit is provided on the substrate (16), and the integrated reaction unit comprises at least a sample cell (1), a mixing cell (2) and a reaction cell (3) connected through liquid channels (6). One end of the sample cell (1) is provided with a sample inlet (4). The sample cell features that it further comprises an internal circulating system of air circuit. One end of the internal circulating system of air circuit is connected with the mixing cell (2), and the other end at least comprises a first circulation branch circuit connected with the end of the sample cell (1) that is far away from the sample inlet (4).

Embodiment 2

The integrated microfluidic chip according to Embodiment 1 features that an exhaust vent (54) that can be opened and closed is provided on the first circulation branch circuit, and the internal circulating system of air circuit is provided with a second liquid blocking structure for blocking liquid at the position near to the mixing cell (2).

Embodiment 3

The integrated microfluidic chip according to Embodiment 1 features that the integrated microfluidic chip is a centrifugal microfluidic chip with a rotation center, and the distances from the sample cell (1), the mixing cell (2) and the reaction cell (3) to the rotation center are increased successively.

Embodiment 4

The integrated microfluidic chip according to Embodiment 3 features that it further comprises a buffer pool (11) arranged between the reaction cell (3) and the mixing cell (2).

Embodiment 5

The integrated microfluidic chip according to Embodiment 3 features that a plurality of the reaction cells (3) are provided, and the distances between these reaction cells (3) and the rotation center are the same, the mixing cell (2) is connected with the reaction cell (3) through a distribution channel (10).

Embodiment 6

The integrated microfluidic chip according to Embodiment 5 features that the distribution channel (10) is wave-shaped, and its crest is close to the rotation center, while its trough is far away from the rotation center. The reaction cell (3) is connected with the trough of the distribution channel (10), and the mixing cell (2) is connected with the head end of the distribution channel (10).

Embodiment 7

The integrated microfluidic chip according to Embodiment 6 features that the other end of the internal circulating system of air circuit further comprises a second circulation branch circuit (9) connected with the tail end of the distribution channel (10).

Embodiment 8

The integrated microfluidic chip according to Embodiment 7 features that the point connecting the internal circulating system of air circuit and the mixing cell (2) is called the first connection point, the point connecting the first circulation branch circuit in the internal circulating system of air circuit and the second circulation branch circuit is called the second connection point, and the distance between the first connection point and the rotation center is larger than that between the second connection point and the rotation center.

Embodiment 9

The integrated microfluidic chip according to Embodiment 7 features that a waste liquid pool (13) is connected respectively on the troughs adjacent to the head end and the tail end of the distribution channel (10).

Embodiment 10

The integrated microfluidic chip according to Embodiment 7 features that a first liquid blocking structure is further arranged on the circulation branch circuit (9).

Embodiment 11

The integrated microfluidic chip according to Embodiment 10 features that the first liquid blocking structure is a first volume expanding chamber (8) for a sudden volume change.

Embodiment 12

The integrated microfluidic chip according to Embodiment 10 features that the internal circulating system of air circuit is further provided with a second liquid blocking structure for blocking liquid at the position close to the mixing cell (2).

Embodiment 13

The integrated microfluidic chip according to Embodiment 12 features that the second liquid blocking structure is a second volume expanding chamber (7) for a sudden volume change.

Embodiment 14

The integrated microfluidic chip according to Embodiment 12 features that both the first liquid blocking structure and the second liquid blocking structure are made from hydrophobic materials, or a hydrophobic layer is applied inside the first liquid blocking structure and the second one.

Embodiment 15

The integrated microfluidic chip according to Embodiment 5 features that it further comprises a sedimentation tank (12) that is connected with the reaction cell (3) and whose distance from the rotation center is larger than that between the reaction cell (3) and the rotation center.

Embodiment 16

The integrated microfluidic chip according to any one of Embodiments 1-15, features that the mixing cell (2) comprises:
a sleeve (18) provided on one side of the substrate (16);
at least two micropores (20) running through two sides of the substrate (16), and connected with the sleeve (18) interior;
a rotor (19) embedded in the sleeve (18), and coordinating with the top surface of the sleeve (18) far from the substrate (16), and a choke plug (21) for blocking and opening any one of the micropores (20) is provided on the rotor (19).

Embodiment 17

The integrated microfluidic chip according to any one of Embodiments 1-15 features that there are a plurality of sample cells (1) connected in parallel, and all sample cells (1) are connected with the mixing cells (2).

Embodiment 18

The integrated microfluidic chip according to any one of Embodiments 1-15, features that there are a plurality of mixing cells (2) that are connected in series.

Embodiment 19

The integrated microfluidic chip according to Embodiment 7 features that the connection point between the internal circulating system of air circuit and the mixing cell (2) is the exhaust vent of the mixing cell (15), and the sample inflow hole of the mixing cell (2) is its liquid inlet hole (14), the distance between the liquid inlet hole (14) and the rotation center is larger than that between the exhaust vent (15) and the rotation center.

Embodiment 20

The integrated microfluidic chip according to any one of Embodiments 1-15, features that it further comprises a buffer zone, of which one end is connected with the first circulation branch circuit and the other end is connected with the sample cell (1).

Embodiment 21

The integrated microfluidic chip according to Embodiment 1, wherein the required reaction reagents are pre-embedded in the sample cell (1), the mixing cell (2) and the reaction cell (3).

Embodiment 22

The integrated microfluidic chip according to Embodiment 1 features that the substrate material (16) is one of or the mixture of some of glass, silicon, metal, or polymer.

Embodiment 23

The integrated microfluidic chip according to Embodiment 1 features that the encapsulation way of the substrate (16) and its assorted cover plate is chosen from hot pressing, gluing, laser welder, ultrasonic welding, or thread screwing.

Example 1

Integrated Microfluidic Chip for Analysis of a Saliva Sample

In this example, a saliva sample analysis is used as an example to further detail how to use the integrated microfluidic chip disclosed herein.

First, a saliva sample was added to the integrated microfluidic chip's sample cell, in which virus cracking reagent is pre-embedded, through the sample inlet. Then the above chip (abbreviation of integrated microfluidic chip) was heated through the supporting equipment at 65° C. for 30 min, to obtain the virus nucleic acid extract. The rotor was then rotated in the mixing cell, to connect the sample cell and the mixing cell through micropores provided in the connecting pipes and the mixing cell. Then, the chip was rotated at 600 rpm and centrifuged for 1 min.

The above virus nucleic acid extract was then transferred to the mixing cell, and the rotor was rotated in the mixing cell to mix evenly the isothermal amplification reagent pre-embedded in the mixing cell with the virus nucleic acid extract. The rotor was then rotated to connect the mixing cell and the distribution pool, and the chip was rotated at 800 rpm and centrifuged for 1 min. The above mixed liquid was then transferred to the distribution pool, after which the chip was rotated at 4000 rpm and centrifuged for 1 min. The liquid in the distribution pool was as a result evenly distributed to the reaction cells, in which the primer that can specially react with the sample nucleic acid was pre-embedded. The chip was then heated at 65° C. for 60 min, and an isothermal amplification reaction was conducted the in the reaction cell, and finally, fluorescence in the reaction cell was detected in real time with the supporting instrument in order to obtain the detection result.

The invention claimed is:

1. A microfluidic chip, comprising a substrate and an integrated unit on the substrate, wherein the integrated unit comprises:
    (1) a sample chamber, a mixing chamber, and a reaction chamber, wherein the sample chamber comprises a sample inlet and is configured to form a first fluid connection with the mixing chamber, and the mixing chamber is configured to form a second fluid connection with the reaction chamber; and
    (2) a circuit configured to provide an air connection between the sample chamber and the mixing chamber;
    wherein a first path of the circuit is connected to the sample chamber at a position distal to the sample inlet;
        wherein the first path comprises a first liquid-blocking structure connected to the sample chamber, and wherein the first liquid-blocking structure comprises a hydrophobic material;
        and the first path comprises a second liquid-blocking structure connected to the mixing chamber, wherein the second liquid-blocking structure comprises a hydrophobic material;
    wherein the microfluidic chip comprises a distribution channel between the mixing chamber and the reaction chamber(s);
    wherein the mixing chamber is connected to one end of the distribution channel, and the other end of the distribution channel is connected to the circuit, via a second path of the circuit;
    wherein the second path comprises a third liquid-blocking structure connected to the distribution channel, wherein the third liquid-blocking structure comprises a hydrophobic material;
    wherein the microfluidic chip is configured to rotate around a rotation center, wherein the microfluidic chip is a centrifugal microfluidic chip;
    wherein the mixing chamber comprises:
    a sleeve disposed on the substrate;
    a rotor disposed within the sleeve, wherein the rotor, the sleeve, and the substrate enclose a space within the mixing chamber;
    two apertures on the substrate, each configured to form a fluid connection between the mixing chamber and the sample chamber or the distributing channel via a channel; and
    a structure disposed on the rotor and extending toward the substrate, wherein the structure is configured to block or close one or both apertures.

2. The microfluidic chip of claim 1, wherein the first fluid connection and/or the second fluid connection is formed via a liquid flow channel.

3. The microfluidic chip of claim 1, wherein the microfluidic chip comprises a plurality of reaction chambers arranged in substantially the same distance to the rotation center.

4. The microfluidic chip of claim 1, wherein the microfluidic chip comprises a buffering chamber between the distribution channel and the reaction chamber(s).

5. The microfluidic chip of claim 1, wherein the distribution channel is wave-shaped and comprises at least one peak and at least one valley, the at least one peak points toward the rotation center, and the at least one valley points away from the rotation center.

6. The microfluidic chip of claim 1, comprising a plurality of the sample chambers connected in parallel, wherein each sample chamber is connected to the same mixing chamber.

7. The microfluidic chip of claim 1, comprising a plurality of the sample chambers connected in series between the sample chamber and the distribution channel.

8. The microfluidic chip of claim 1, wherein the sample chamber, the mixing chamber, and/or the reaction chamber comprise one or more reagents, optionally deposited or pre-embedded in the chamber(s).

9. The microfluidic chip of claim 1, wherein the substrate comprises a material selected from the group consisting of a glass, silicon, a metal or alloy, a polymer, and any combination thereof.

10. The microfluidic chip of claim 1, which is manufactured by bonding a cover plate to the substrate by hot pressing, gluing, laser welding, ultrasonic welding, screwing, molding as one piece, fixed integrally injection molding, or any combination thereof.

11. A system, comprising the microfluidic chip of claim 1, and optionally a means for detecting a reaction in the microfluidic chip.

12. A kit, comprising the microfluidic chip of claim 1, and optionally one or more reagents for performing a reaction in the microfluidic chip, and/or one or more reagents for detecting a reaction in the microfluidic chip.

13. A method of analyzing an analyte, comprising:
1) loading a sample into the sample chamber of the microfluidic chip of claim 1;
2) rotating the microfluidic chip around a rotation center, such that the sample is delivered from the sample chamber to the mixing chamber, mixed in the mixing chamber, and delivered from the mixing chamber to the reaction chamber;
3) performing a reaction in the reaction chamber; and
4) measuring an indicator of the reaction,
wherein the indicator indicates the presence, absence, amount, or a property of an analyte in the sample.

* * * * *